US012591448B2

(12) United States Patent
Hodigere et al.

(10) Patent No.: US 12,591,448 B2
(45) Date of Patent: Mar. 31, 2026

(54) SERVER-SIDE CONTROL OF POWER BASED ON SERVICE-LEVEL AGREEMENT

(71) Applicant: MICROSOFT TECHNOLOGY LICENSING, LLC, Redmond, WA (US)

(72) Inventors: Arun Venkatasubbaiah Hodigere, Bangalore (IN); Anand Haridass, Bangalore (IN); Karunakara Kotary, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 224 days.

(21) Appl. No.: 18/500,663

(22) Filed: Nov. 2, 2023

(65) Prior Publication Data

US 2025/0147784 A1 May 8, 2025

(51) Int. Cl.
*G06F 9/455* (2018.01)
*G06T 1/20* (2006.01)

(52) U.S. Cl.
CPC ............ *G06F 9/45558* (2013.01); *G06T 1/20* (2013.01); *G06F 2009/45583* (2013.01)

(58) Field of Classification Search
CPC .... G06F 9/45558; G06F 9/45533; G06F 9/48; G06F 9/5094; G06F 9/4893; G06F 2009/45583; G06F 2209/504; G06T 1/20
USPC .............................. 345/501; 703/300; 718/1
See application file for complete search history.

(56) References Cited

U.S. PATENT DOCUMENTS

| | | | |
|---|---|---|---|
| 9,530,174 B2 | 12/2016 | Vaishampayan et al. | |
| 9,733,963 B2 | 8/2017 | Hansson et al. | |
| 10,599,453 B1 * | 3/2020 | Rathnavelu | G06F 9/45558 |
| 11,996,988 B1 * | 5/2024 | Ramakrishnan | H04L 41/16 |

(Continued)

FOREIGN PATENT DOCUMENTS

CN        108965364 B        6/2021

OTHER PUBLICATIONS

Homma Hiroyuki; Information Processor and Control Method of Information Processor; Jan. 14, 2021; Fujitsu Ltd; JP2021005331 (A) ; paras. 1-176, Figs. 1-27 English.*

(Continued)

*Primary Examiner* — Prabodh M Dharia
(74) *Attorney, Agent, or Firm* — Shook Hardy & Bacon L.L.P.

(57) ABSTRACT

Various embodiments described herein dynamically control the distribution of power to individual components of a node in an overprovisioned rack, node, or accelerators of a data center based on service-level agreements (SLAs) defining priorities for workloads for certain user accounts. The SLA is used to determine a throttling order for throttling the accelerators. Controlling the distribution of power in the node includes throttling at an accelerator or coprocessor, based on the throttling order or SLA, until the power consumption is at or below a power limit. In this manner, various embodiments discussed herein provide (1) granular control over the execution of tasks in an overprovisioned rack and (2) a user experience consistent with a priority level defined by an SLA, while complying with power policy limit(s) to improve the lifespan and operation of hardware, as well as to reduce the wear and tear experienced by overprovisioned hardware.

20 Claims, 10 Drawing Sheets

(56) References Cited

U.S. PATENT DOCUMENTS

| 2008/0301473 | A1* | 12/2008 | Perez | G06F 1/3246 |
|---|---|---|---|---|
| | | | | 713/300 |
| 2011/0213997 | A1* | 9/2011 | Kansal | G06F 1/3206 |
| | | | | 713/340 |
| 2016/0203012 | A1* | 7/2016 | Dong | G06F 9/455 |
| | | | | 718/1 |
| 2018/0159780 | A1* | 6/2018 | Essigmann | H04L 47/263 |
| 2019/0163540 | A1* | 5/2019 | Lee | G06F 9/5077 |
| 2021/0109786 | A1* | 4/2021 | Choudhary | G06F 9/5044 |
| 2024/0004447 | A1* | 1/2024 | Maddukuri | G06F 1/30 |

OTHER PUBLICATIONS

Gao, et al., "Service level agreement based energy-efficient resource management in cloud data centers", In Journal of Computers & Electrical Engineering, Nov. 25, 2013, pp. 1621-1633.

* cited by examiner

Node with Universal Base Board
(UBB) Containing GPU OAMs

Node Design with Discrete GPUs

CPU Host Agent Sets GPU Power Limits

MB BMC Sets GPU Power Limits

500

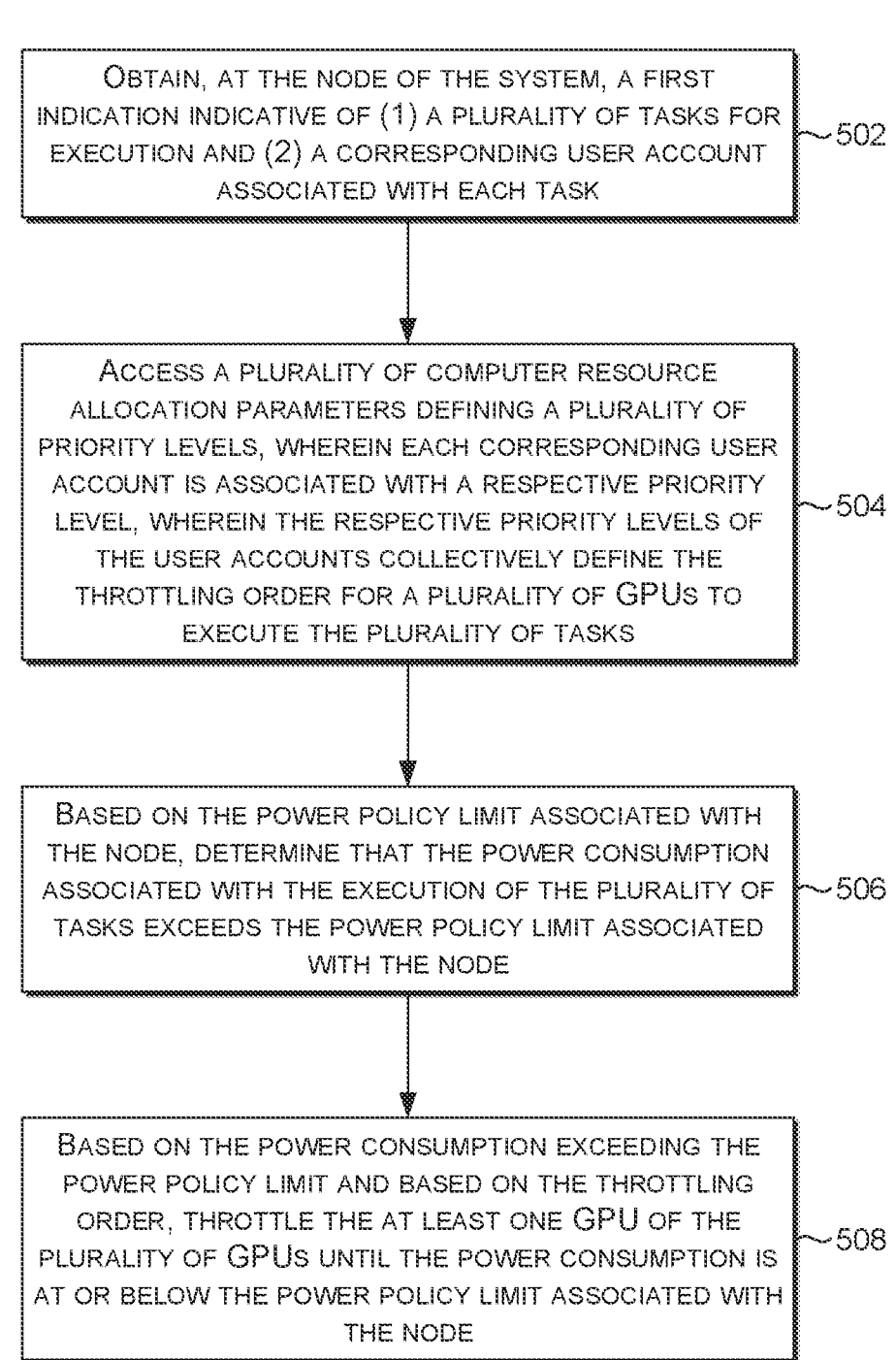

OBTAIN, AT THE NODE OF THE SYSTEM, A FIRST INDICATION INDICATIVE OF (1) A PLURALITY OF TASKS FOR EXECUTION AND (2) A CORRESPONDING USER ACCOUNT ASSOCIATED WITH EACH TASK ~502

ACCESS A PLURALITY OF COMPUTER RESOURCE ALLOCATION PARAMETERS DEFINING A PLURALITY OF PRIORITY LEVELS, WHEREIN EACH CORRESPONDING USER ACCOUNT IS ASSOCIATED WITH A RESPECTIVE PRIORITY LEVEL, WHEREIN THE RESPECTIVE PRIORITY LEVELS OF THE USER ACCOUNTS COLLECTIVELY DEFINE THE THROTTLING ORDER FOR A PLURALITY OF GPUs TO EXECUTE THE PLURALITY OF TASKS ~504

BASED ON THE POWER POLICY LIMIT ASSOCIATED WITH THE NODE, DETERMINE THAT THE POWER CONSUMPTION ASSOCIATED WITH THE EXECUTION OF THE PLURALITY OF TASKS EXCEEDS THE POWER POLICY LIMIT ASSOCIATED WITH THE NODE ~506

BASED ON THE POWER CONSUMPTION EXCEEDING THE POWER POLICY LIMIT AND BASED ON THE THROTTLING ORDER, THROTTLE THE AT LEAST ONE GPU OF THE PLURALITY OF GPUs UNTIL THE POWER CONSUMPTION IS AT OR BELOW THE POWER POLICY LIMIT ASSOCIATED WITH THE NODE ~508

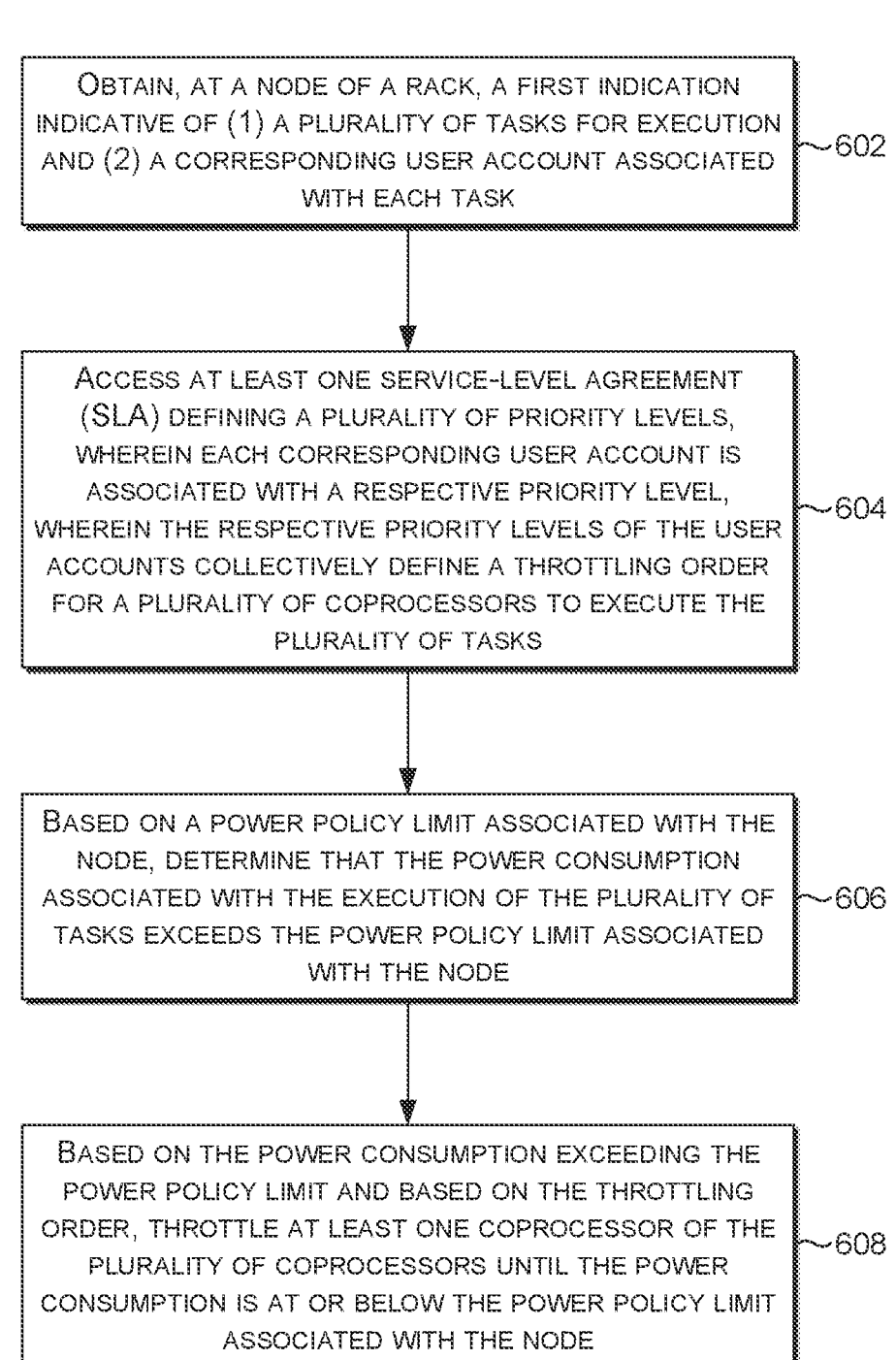

OBTAIN, AT A NODE OF A RACK, A FIRST INDICATION INDICATIVE OF (1) A PLURALITY OF TASKS FOR EXECUTION AND (2) A CORRESPONDING USER ACCOUNT ASSOCIATED WITH EACH TASK ∼602

ACCESS AT LEAST ONE SERVICE-LEVEL AGREEMENT (SLA) DEFINING A PLURALITY OF PRIORITY LEVELS, WHEREIN EACH CORRESPONDING USER ACCOUNT IS ASSOCIATED WITH A RESPECTIVE PRIORITY LEVEL, WHEREIN THE RESPECTIVE PRIORITY LEVELS OF THE USER ACCOUNTS COLLECTIVELY DEFINE A THROTTLING ORDER FOR A PLURALITY OF COPROCESSORS TO EXECUTE THE PLURALITY OF TASKS ∼604

BASED ON A POWER POLICY LIMIT ASSOCIATED WITH THE NODE, DETERMINE THAT THE POWER CONSUMPTION ASSOCIATED WITH THE EXECUTION OF THE PLURALITY OF TASKS EXCEEDS THE POWER POLICY LIMIT ASSOCIATED WITH THE NODE ∼606

BASED ON THE POWER CONSUMPTION EXCEEDING THE POWER POLICY LIMIT AND BASED ON THE THROTTLING ORDER, THROTTLE AT LEAST ONE COPROCESSOR OF THE PLURALITY OF COPROCESSORS UNTIL THE POWER CONSUMPTION IS AT OR BELOW THE POWER POLICY LIMIT ASSOCIATED WITH THE NODE ∼608

MEMORY

812

PROCESSOR(S)

814

PRESENTATION
COMPONENT(S)

816

RADIO(S)

824

810

I/O PORT(S)

818

I/O COMPONENTS

820

POWER SUPPLY

822

900

SERVER-SIDE CONTROL OF POWER BASED ON SERVICE-LEVEL AGREEMENT

BACKGROUND

Performing computations, workloads, or tasks in a distributed environment, such as a "cloud computing system" or the "cloud," generally represents a transformative paradigm in computing that leverages the power of remote data centers to perform complex computing tasks. An example of complex computing workflows or tasks include those associated with artificial intelligence (AI). Accessibility to AI has been facilitated by the widespread adoption of the cloud, which has evolved in response to the increasing demand for computational resources that exceed the computational resources available on individual devices running locally on-premises. Recent widespread adoption of AI-related tasks have caused the demand for computational resources provided by certain distributed environments to increase. For example, running AI-based computations includes processing raw data, initializing AI models, iteratively training the AI models, validating the AI models, deploying the trained and validated AI models, and processing user requests made against these deployed AI models. In some instances, the computational demands associated with making these services accessible exceed the cloud computational resources available, resulting in overprovisioned hardware, outages, delays, or other customer interruptions.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein dynamically control the distribution of power to individual components of a node in an overprovisioned rack, node, or accelerators (also referred to as "coprocessors" in one example) of a data center based on service-level agreements (SLAs) defining priorities for workloads for certain user accounts. Certain SLAs define resource allocation parameters and a priority level for various user accounts based on a subscription or workload type of the task from the user account. One example of dynamically controlling the distribution of power includes throttling components of a node, such as accelerators (for example, graphics processing units [GPUs]), based on a priority level of user accounts' associated tasks assigned to particular accelerators of the node. In one embodiment, a set of accelerators are controlled to provision, start, maintain, or shut down virtual machines (VMs), such that throttling the accelerators controls the provision and orchestration of virtual machines across workflows for different users. In one example, "VM" refers to a software version of a computer running its own operating system (OS) and programs, which can connect to different networks via any suitable virtualization processes, such as Hyper-V.

In one embodiment, dynamically controlling the distribution of power to individual components (for example, accelerators) of a node includes throttling the accelerators based on the priority level of the tasks running on the corresponding accelerators. In one embodiment, the priority levels of the tasks are based on a priority level of the user account associated with the task. As a result, in some embodiments, accelerators running tasks received from user accounts having a lower priority level are to be throttled before tasks received from user accounts having a higher priority level. In this manner, various embodiments discussed herein provide (1) granular control over the execution of tasks in an overprovisioned rack and (2) a user experience consistent with a priority level defined by an SLA, while complying with power policy limit(s) to improve the lifespan and operation of hardware components, as well as to reduce the wear and tear experienced by overprovisioned hardware components.

The present disclosure provides one or more technical solutions that have technical effects in light of various technical problems. For example, particular embodiments have the technical effect of improved lifespan and operation of hardware components in data centers by enforcing a throttling order based on a power policy limit and SLA. Further, particular embodiments have the technical effect of ensuring compliance with regional or organizational power policy regulations, while maintaining a strong compliance with SLAs, which is not possible absent the embodiments disclosed herein. Additionally, certain embodiments have the technical effect of increasing scalability, allowing computing systems to enforce dozens, hundreds, thousands, or even millions of SLAs and execute workflows based on a throttling order.

BRIEF DESCRIPTION OF THE DRAWINGS

The present invention is described in detail below with reference to the attached drawing figures, wherein:

FIG. 5 depicts a flow diagram of a method for throttling the at least one graphics processing unit (GPU) of a plurality of GPUs until the power consumption is at or below the power policy limit associated with the node, in accordance with an embodiment of the present disclosure;

FIG. 6 depicts a flow diagram of a method for throttling at least one coprocessor of the plurality of coprocessors until the power consumption is at or below the power policy limit associated with the node, in accordance with an embodiment of the present disclosure;

DETAILED DESCRIPTION

Figure 1:
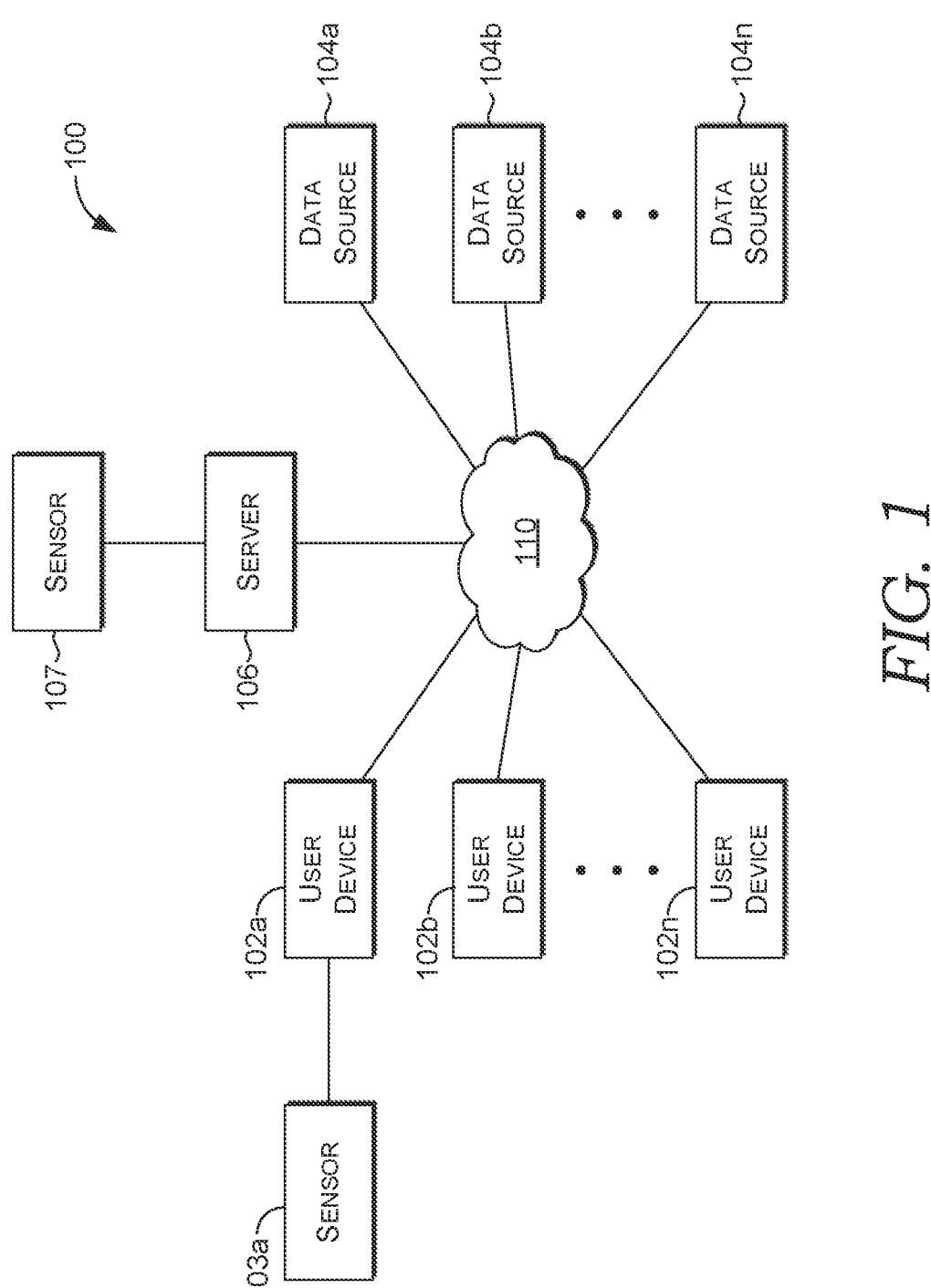
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Embodiments of the technology described herein dynamically control the distribution of power to individual components of a node in an overprovisioned rack, node, or set of accelerators of a data center based on service-level agreements (SLAs) of workloads. In one example, "overprovisioning" refers to the practice of allocating more cloud computing resources, such as processing power, memory, storage, or network bandwidth, than what is currently required by the workload or application, sometimes to ensure that an application has enough resources to handle any spikes in traffic or usage, and to prevent performance degradation or downtime. In one example, an "accelerator" or a "coprocessor" refers to a piece of hardware utilized in a data center and used to run a virtual machine and/or execute a workflow based on an SLA associated with the user account that submits the workflow. In one example, the term "coprocessor" or "accelerator" excludes central processing units (CPUs) and includes components that work in conjunction with the CPUs, such as a graphics processing unit (GPU), a field-programmable gate array (FPGA), or an application-specific integrated circuit (ASIC), among other suitable processing hardware devices. In one example, a "node" refers to a physical computer system with a distinct host internet protocol (IP) address that is running one or more application servers.

In one example, an "SLA" refers to an agreement defining computer resource allocation parameters between a service provider (for example, a cloud computing services provider) and an account of a customer (also referred to herein in one example as a "user"). In one example, the computer resource allocation parameters include cloud computing resource allocations to one or more customers during certain server operating conditions, such as during high network activity, low network activity, or any suitable computer resource allocation parameters associated with the SLA. In one example, "user account" or "customer account" refers to the account or subscription created by a user or organization with a cloud service provider. In one embodiment, the user account is associated with specific users or organizations and includes specific billing and payment information, access, permissions, resource management consistent with the SLA, security and compliance information, subscription management information, and other information, such as computer resource allocation parameters, associated with a user's interaction within a cloud computing environment.

Example SLAs define computer resource allocation parameters that may be specific to a group of people or a customer via respective customer accounts. For example, an SLA defines a quality, availability, and other responsibilities associated with the level of service provided by a service provider to a customer. In one embodiment, the SLA defines computer resource allocation parameters of the data center and the network that will be used to process workflows from customers, for example, based on overall demand. Certain SLAs define any number of computer resource allocation parameters that are user- or customer-specific. For example, an SLA can classify workflows (also referred to herein in one example as "tasks") from user accounts based on the job type and the deployment type. In one example, the job type refers to the task classification and includes any suitable classification such as "basic," "standard," and/or "premium," as defined by the SLA. In one example, the deployment type refers to the binary or non-binary classification indicative of whether the workflow is being deployed in a production or non-production environment, as defined by the SLA. In this example, the job type and the deployment type collectively define a priority level for tasks received from various user accounts. The priority level of tasks received from various user accounts can alternatively or additionally be based on any computer resource allocation parameter(s) defined by the SLA. In one embodiment, the priority level is directly related to a throttling order, as described herein.

One example of dynamically controlling the distribution of power includes throttling components of a node, such as accelerators. In some embodiments, the accelerators are throttled based on a throttling order that is determined based on a priority level of user accounts associated tasks assigned to particular accelerators. In one embodiment, the throttling order is determined based on an aggregate throttling order value or other weight value associated with the task(s) to be performed by an accelerator. In one example, the "throttling order" refers to a sequence listing an order for throttling accelerators until the power consumption of the rack or the component of the rack is at or below a power policy limit. The throttling order may be based on a throttling order value indicative of a relative ranking of the priority level of the task assigned to the corresponding accelerator.

In one embodiment, dynamically controlling the distribution of power to accelerators of a node includes throttling the accelerator based on a throttling order that is based on the priority level of the tasks running on the corresponding accelerators. In one example, "throttling" of the accelerators (for example, GPUs) of a node refers to dropping the accelerator clock speeds or reducing temperatures of the accelerators. For example, throttling the accelerators includes lowering a frequency or lowering a voltage of the accelerators. In some instances, throttling an accelerator causes a lag or a delay in the performing of certain computations or causes resources allocated to particular tasks to be reduced or reallocated to other tasks. For example, throttling accelerators causes the shutting down or reallocation of resources from (1) a task associated with an account having a low-priority level to (2) a task associated with a user account having a higher priority level until the power consumption is at or below a power policy limit. Although certain embodiments are discussed in the context of throttling GPUs, it should be understood that these embodiments are not limited to GPUs, as certain embodiments may alternatively or additionally employ other accelerators, including but not limited to a CPU, FPGA, or ASICs, and/or other hardware components.

In one embodiment, throttling the GPU comprises reallocating resources from (1) a first virtual machine assigned to a first set of tasks to (2) a second virtual machine assigned to a second set of tasks. In this example, the first set of tasks is associated with a user account having a priority level that is lower than a priority level of a user account associated with the second set of tasks. In one embodiment, throttling the at least one GPU comprises shutting down a virtual machine assigned to a first set of tasks. In this example, the first set of tasks are associated with a user account having a priority level that is lower than a priority level of a user account associated with a second set of tasks.

In one embodiment, the throttling order is based on the priority levels of the tasks associated with user accounts, for example, as defined by the SLA. For example, suppose a first user is a user paying for a premium subscription, such that the account of the first user is associated with a high-priority level, as defined by the SLA. Further suppose that a second user is a user using a free subscription, such that the account of the second user is associated with a lower priority level, as defined by the SLA. In this example, workloads or tasks from the first user are given a higher priority level than workloads or tasks from the second user. The workloads or tasks can be ordered based on priority levels, such that a lower priority level (or a higher priority level) are associated with higher (or lower) throttling orders, and higher priority levels (or lower priority levels) are associated with a lower (or higher) throttling order. Therefore, in one embodiment, the throttling order is inversely proportional to the priority levels of tasks. In this manner and continuing with this example, when a power output (or power consumption) of a rack, a node, or a GPU exceeds a power policy limit, the components of the node that are assigned to execute the task from the second user are throttled before the task from the first user because tasks from the first user are afforded a higher priority level than those of the second user based on the SLA. As a result, in some embodiments, tasks received from user accounts having a lower priority level are higher within the throttling order and therefore are throttled before tasks received from user accounts having a higher priority level. Accordingly, various embodiments discussed herein provide (1) granular control over the execution of tasks and deployment of virtual machines (VMs) in an overprovisioned rack and (2) a user experience consistent with a priority level defined by an SLA, while complying with power policy limits to reduce the wear and tear experienced by overprovisioned hardware components.

Certain components used to control power in data centers are unaware and do not have access to SLAs to ensure compliance with various SLAs. Whereas certain existing technologies may allow for the on-premises control of power to CPUs, such power control of CPUs fails to provide a granular level of control for virtual machine orchestration consistent with an SLA across one or more data centers and also fails to address issues associated with large-scale computations, such as those associated with AI workflows. Instead, controlling the power of certain CPUs would throttle all GPUs controlled by the CPU, causing all GPUs to be throttled and all virtual machines to be affected, which would fail to achieve granular control of tasks based on priority levels of corresponding users. In other words, it would be near impossible to enforce SLA for different customers within a node by power capping a CPU since such a power-capping scheme would affect all customers having workflows being processed by a particular node.

By employing certain embodiments discussed herein, throttling accelerators assigned workflows (also referred to in one example as "tasks") from low-priority user accounts (as defined by an SLA) allows a rack, node, or GPU to operate within power constraints, while preventing outages and un-interrupting the user experience for high-priority user accounts (as defined by the SLA), especially in the context of high computing resource utilization, such as processing AI workflows. In this manner, throttling certain accelerators allows for granular control of virtual machine deployment and orchestration within a node. Accordingly, various embodiments discussed herein offer technical advantages over existing technologies that can at best control power sent to the CPU.

Particular embodiments have the technical effect of improved lifespan and operation of hardware components in data centers, for example. This is because power capping components of a rack of a data center prevents hardware components, such as GPUs, from operating beyond peak levels that would cause quicker deterioration of the lifespan of GPUs. For example, operating GPUs at or below power policy prevents overheating or power surges during peak times, thereby preserving the lifespan of the GPUs and reducing the need for increased hardware component servicing or replacement within a data center. In this manner, particular embodiments facilitate long-term peak performance of accelerators so that data centers can continuously perform customer workflows.

Certain embodiments have the technical effect of controlling accelerators to achieve compliance with regional or organizational policy regulations. Certain providers of cloud computing services have data centers across different regions of the world, each with different regulations and rules surrounding the use of power. By employing certain embodiments disclosed herein, cloud computing service providers can comply with regional power regulations while providing customers a quality of service that is consistent with the SLA. This dual benefit of compliance with a policy regulation while better complying with a quality of service of the SLA is difficult if not impossible to achieve absent the embodiments disclosed herein.

Additionally, certain embodiments have the technical effect of increasing computational scaling to enforce dozens, hundreds, thousands, or even millions of SLAs and execute workflows based on a throttling order. As discussed herein, determining a throttling order is associated with reduced computational resource consumption since determining the throttling order can be based on the throttling order value or other weight values associated with a priority level. Indeed, certain embodiments used to determine a priority level are based on simple arithmetic that makes enforcing the SLA and complying power capping a computationally inexpensive operation. In this manner, ensuring quality of service and compliance with a power policy can be scaled and enforced across large-scale operations associated with one or more data centers.

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that operating environment 100 shown in FIG. 1 is an example of one suitable operating environment. Each of the components shown in FIG. 1 is implemented via any type of computing device, such as computing device 800 illustrated in FIG. 8, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing environment 900 in FIG. 9. For instance, server 106 is provided via multiple devices arranged in a distributed environment that collectively provides the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. For example, user device 102a associated with a user account can communicate workflows over network 110 to the server 106 for processing consistent with the corresponding SLA. This division of operating environment 100 is provided to illustrate one example of a suitable environment, and there is no requirement for each implementation that any combination of server 106 and user devices 102a and 102b through 102n remain as separate entities. In one embodiment, the server 106 corresponds to systems 200, 250, 300, 350, 400, or 450 of FIGS. 2A, 2B, 3A, 3B, 4A, and 4B, respectively.

In some embodiments, user devices 102a and 102b through 102n comprise any type of computing device capable of use by a user. For example, in one embodiment, user devices 102a and 102b through 102n are the type of computing device 800 described in relation to FIG. 8. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, data sources 104a and 104b through 104n comprise data sources and/or data systems, which are configured to make data available to any of the various constituents of operating environment 100 or systems 200, 250, 300, 350, 400, or 450, as described in FIGS. 2A, 2B, 3A, 3B, 4A, and 4B, respectively. For instance, one or more data sources 104a and 104b through 104n provide (or make available for accessing) a throttling order, a power policy, GPU specifications, computer resource allocation parameters associated with an SLA, and any other data disclosed herein. Certain data sources 104a and 104b through 104n are discrete from user devices 102a and 102b through 102n and server 106 or are incorporated and/or integrated into at least one of those components. In one embodiment, one or more of data sources 104a and 104b through 104n comprise one or more sensors, which are integrated into or are associated with one or more of the user device(s) 102a and 102b through 102n or server 106. Examples of data made available by data sources 104a and 104b through 104n can include a throttling order, a power policy, GPU specifications, computer resource allocation parameters associated with an SLA, and any other data disclosed herein.

Operating environment 100 can be utilized to implement one or more of the components of systems 200, 250, 300, 350, 400, or 450, as described in FIGS. 2A, 2B, 3A, 3B, 4A, and 4B, respectively, to perform any suitable operations. Example operations include obtaining a first indication indicative of (1) a plurality of tasks for execution and (2) a corresponding user account associated with each task; accessing at least one service-level agreement (SLA) defining a plurality of priority levels that collectively define a throttling order for a plurality of coprocessors to execute the plurality of tasks; determining, based on a power policy limit associated with the node, that the power consumption associated with the execution of the plurality of tasks exceeds the power policy limit associated with the node; and throttling, based on the power consumption exceeding the power policy limit and based on the throttling order, at least one coprocessor of the plurality of coprocessors until the power consumption is at or below the power policy limit associated with the node. Operating environment 100 can also be utilized for implementing aspects of methods 500, 600, and 700 in FIGS. 5, 6, and 7, respectively.

Figure 2B:
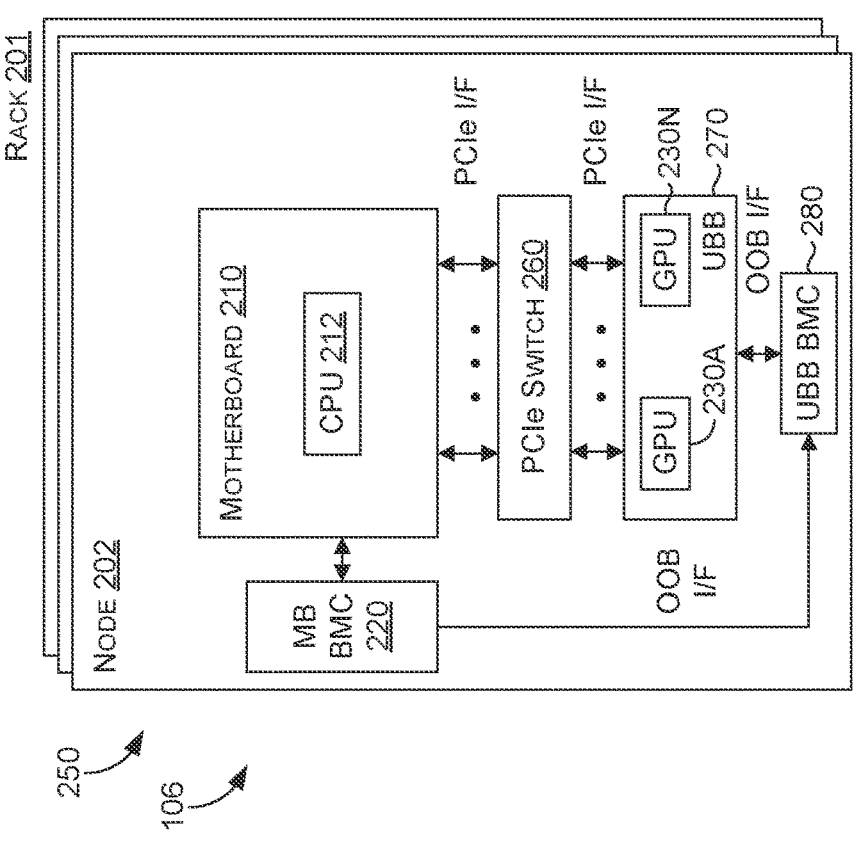
FIG. 2B is a block diagram of an example system including a node having a uniform baseboard (UBB) containing discrete accelerators, in accordance with an embodiment of the present disclosure.
Figure 2A:
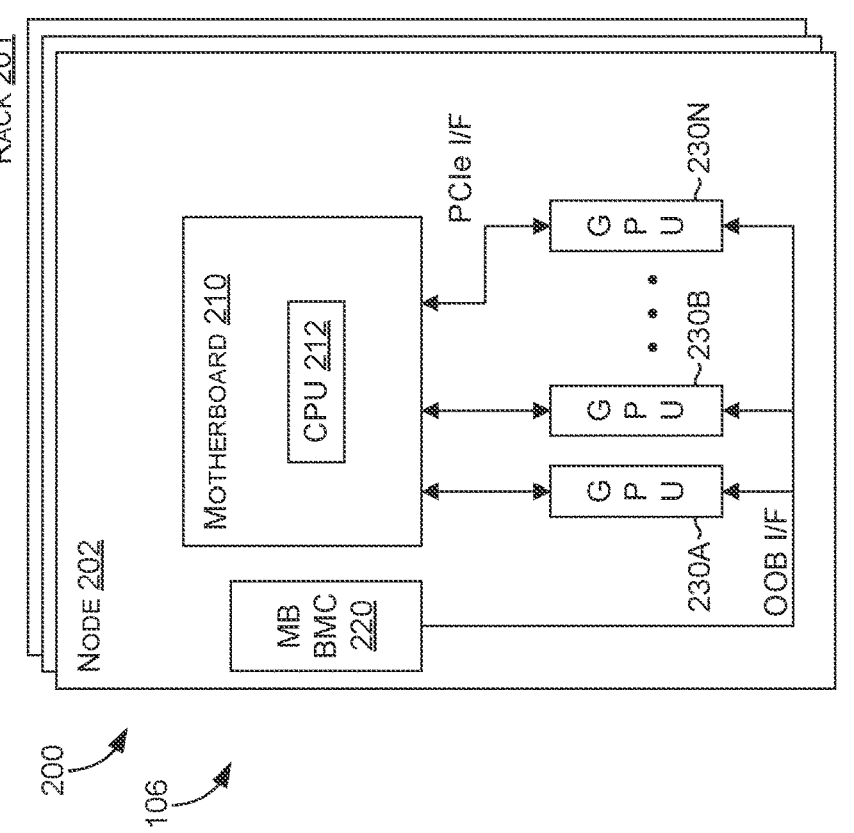
FIG. 2A is a block diagram of an example system including a node having discrete accelerators, in accordance with an embodiment of the present disclosure.

Referring now to FIG. 2A, depicted is a block diagram of an example system 200 including a node 202, in accordance with an embodiment of the present disclosure. As illustrated, the system 200 includes a rack 201 including any number of nodes 202. As illustrated, the node 202 includes a motherboard 210 having a CPU 212; a motherboard (MB) baseboard management controller (BMC) 220; and discrete accelerators, such as the illustrated GPUs 230A and 230B, through 230N. In one embodiment, the node 202 refers to an individual self-contained server unit within the rack 201. In one example, the node 202 runs applications, processes data, and performs various tasks. Certain nodes 202 vary in terms of processing power, memory, storage, and other specifications. In a data center, nodes 202 can be organized into a cluster or network to collectively handle the computational and storage needs of applications. In one embodiment, node 202 corresponds to node 930 of FIG. 9.

In one example, the MB BMC corresponds to a controller that monitors the power consumption of the node and determines whether the power consumption is within or outside of a target range defined by at least one power policy limit (for example, the first or second power policy limit described herein). As discussed herein, embodiments of the MB BMC 220 receive an indication of or determine the throttling order for GPUs (for example, 230A and 230B, through 230N) and control the execution of tasks by throttling the GPUs based on an SLA, the throttling order, and/or a power policy limit. For example, the MB BMC 220 directly communicates control signals to the GPUs to throttle one or more GPUs and control the GPU's execution of tasks to bring the power at or below a power policy limit. In another example, the MB BMC 220 communicates the throttling order to the motherboard 210, causing the motherboard 210 to throttle the GPUs until the power is at or below a power policy limit.

In one example, a "rack," "server rack," or "data center rack" refers to an assembly of multiple nodes 202 or servers, each with its own motherboard 210. The nodes 202 within the rack 201 work together to deliver the computational power and services required for large-scale data center operations. The arrangement of nodes 202 in the rack 201 can vary depending on the specific needs and configurations of the data center. In one example, the "motherboard" refers to the main circuit board of the node 202 and includes a CPU 212, a memory (such as that illustrated in FIGS. 8 and 9), and other components that enable the node 202 to function. The motherboard serves as the central hub for connecting all the hardware components within a server. It also provides various interfaces and connectors for networking, storage, and expansion options. It's essentially the backbone of a server, connecting and facilitating communication between all the server's parts.

In some embodiments, the node 202 runs and implements artificial intelligence (AI) and machine learning (ML) based on workflows submitted by user devices via corresponding applications. Although the illustrated embodiments include GPUs 230A and 230B, through 230N, in one embodiment, nodes 202 that run these AI and ML workflows have 4 accelerators, 8 accelerators, 16 accelerators, 64 accelerators, or any suitable number of accelerators. In one embodiment, the GPUs running these AI and ML workflows experience a high-power draw and consume hundreds of watts of power under peak workloads.

To facilitate controlling the GPUs 230, the node 202 employs any suitable interface connecting the motherboard 210 to the GPUs 230. In a first non-limiting example, the node 202 employs Peripheral Component Interconnect Express (PCIE), such as PCIE Form Factor (FF) to facilitate the motherboard 210 in controlling and throttling the GPUs 230, as well as implementing the embodiments disclosed herein. In one example, the "PCIE" refers to a high-speed interface used for connecting various hardware components inside a node 202 to enable the execution of computationally intensive tasks, such as AI and ML workflows. Different generations of PCIe (for example, PCIe 3.0, PCIe 4.0, or PCIe 5.0) can offer varying levels of bandwidth and performance, with certain newer versions of PCIe providing faster data transfer speeds and improved GPU performance (for example, lower latency) when paired with motherboard 210, for example. In one embodiment, the node 202 employing the PCIE FF consumes between about 75 W to 400 W of power.

In a second non-limiting example, the node 202 employs Open Compute Project (OCP) Accelerator module (OAM), such as OAM Form Factor (FF), to facilitate the motherboard 210 in controlling and throttling the GPUs 230, as well as implementing the embodiments disclosed herein. In one example, the "OAM" refers to a high-speed interface used for connecting various hardware components inside a node 202 to enable the execution of computationally intensive tasks, such as AI and ML workflows. In one embodiment, the node 202 employing the OAM FF consumes between about 500 W to 750 W of power.

Figure 9:
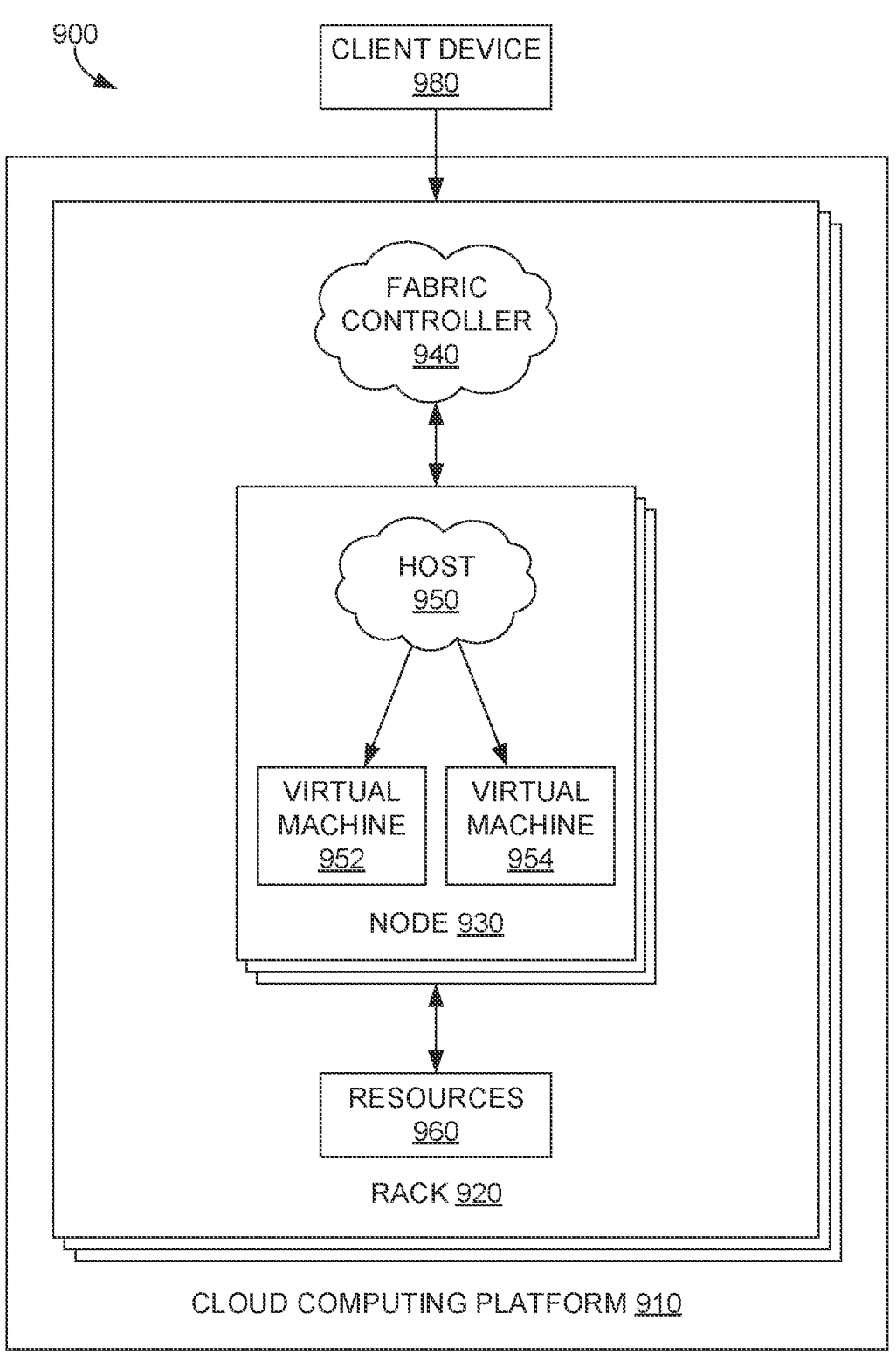
FIG. 9 is a block diagram of an example computing environment suitable for use in implementing an embodiment of the present disclosure.

In some embodiments, the system 200 maximizes the use of provisioned power by oversubscribing racks, such as rack 920 of FIG. 9, with more nodes 202, GPUs 230, or other computational resources. Often, the aggregate peak power of individual nodes 202 in the rack could exceed the total power budget allocated to the rack. Oversubscription of rack power carries the risk of tripping the rack under peak spikes and hence requires functionality like power capping to limit the power consumed by individual server nodes.

In one embodiment, AI or ML workloads are classified as AI training workloads, AI inference workloads, or any other classification. In one example, AI training workloads are run across multiple racks in a cluster to train one or more models based on training models. However, certain AI training workloads can be run across multiple clusters. On the other hand, in one example, AI inference workloads run within a rack on one or more nodes 202 to perform AI-related tasks, such as predictions, classifications, and generation of content, such as text, images, video, music, sounds, and the like. In some embodiments, AI inference workloads consume less compute power than AI training workloads. It should be understood that this disclosure is not limited to AI or ML workloads, such as those described herein, because the embodiments disclosed herein facilitate performing other additional or alternative tasks, such as rendering, gaming, or other GPU-based workloads. Indeed, in some embodiments, a combination of AI or ML tasks, as well as other GPU-based workloads can be performed by the components of node 202 or the rack.

FIG. 2B is a block diagram of an example system 250 including a node 202, in accordance with an embodiment of the present disclosure. As illustrated, the system 200 includes a rack 201 including a node 202. As illustrated, the node 202 includes a motherboard 210 having a CPU 212; an MB BMC 220; a PCIe Switch 260; a universal baseboard (UBB) 270 having discrete accelerators, such as the illustrated GPUs 230A and 230B, through 230N; and a UBB BMC 280. In one example, the PCIe switch 260 refers to a hardware component that manages and routes PCIe connections between various devices of system 250. In one embodiment, the PCIe switch manages device expansion, load balancing, redundancy, and bandwidth among devices connected to the motherboard 210.

In one embodiment, the UBB 270 refers to a hardware component designed to accommodate and support various types of computer-on-modules (COMs) or system-on-modules (SOMs), such as the illustrated GPUs 230A through 230N. In one embodiment, the UBB 270 provides a common interface, connectors, and peripherals that can be used with different COMs, SOMs, and GPUs 230A through 230N. Example UBBs 270 include connectors, interfaces, power management, and various input/output (I/O) options (such as universal serial bus [USB], Ethernet, high-definition multimedia interface [HDMI], general-purpose input/output [GPIO], and the like), making it compatible with a range of SOMs, COMs, and/or GPUs 230A through 230N, for example, from various manufacturers. By allowing the interoperability of various SOMs, COMs, and/or GPUs 230A through 230N, the UBB 270 can facilitate the development process and promote interchangeability of processing modules while reducing the burdens for custom hardware design. In this manner, certain embodiments of the node 202 employ the UBB 270 and switch out the SOMs, COMs, and/or GPUs 230A through 230N as needed for different workloads and applications to avoid having to design a custom baseboard for each SOM, COM, and/or GPU 230A through 230N.

In one embodiment, the UBB BMC 280 corresponds to a controller that monitors the power consumption of the UBB 270 or the one or more GPUs 230A through 230N and determines whether the power consumption is within or outside of a target range defined by at least one power policy limit (for example, the third power policy limit described herein). As discussed herein, embodiments of the UBB BMC 280 receive an indication of or determine the throttling order for GPUs (for example, 230A and 230B, through 230N) and control the execution of tasks by throttling the GPUs based on an SLA, the throttling order, and/or at least one power policy limit. For example, the UBB BMC 280 directly communicates control signals to the GPUs to throttle one or more GPUs and controls the GPU's execution of tasks to bring the power at or below a power policy limit. In another example, the UBB BMC 280 communicates the throttling order to the motherboard 210 or the PCIe switch 260 to cause the motherboard 210 or PCIe switch 260 to throttle the GPUs until the power is at or below a power policy limit.

Unlike system 200, system 250 includes a node 202 having the PCIe switch 260; the UBB BMC 280; and the UBB having GPUs 230A and 230B, through 230N. For example, whereas in system 200 the MB BMC 280 sends to the GPUs 230A and 230B, through 230N, the request to reduce power consumption for throttling GPUs based on the throttling order and power policy limit, in system 250, MB BMC 220 sends the power-capping request to the UBB BMC 280. In one embodiment, the UBB BMC 280 submits control signals to the GPUs 230A and 230B, through 230N (for example, via slots or OAMs) to reduce the power of individual GPUs. In one example, submitting the control signals to the GPUs 230A and 230B, through 230N includes writing in the power cap limit directly to the GPU. An example command includes "Set Power Cap Limit," which is directly written to the GPUs using Intelligent Platform Management Interface (IPMI) or REDFISH®. In one example, "IPMI" refers to an open, industry-standard interface that was designed for the management of server systems over a number of different types of networks. IPMI functionality includes field-replaceable unit (FRU) inventory reporting, system monitoring, logging of system events, system recovery (including system resets and power-on and power-off capabilities), and alerting, to name a few.

Figures 3A, 3B:
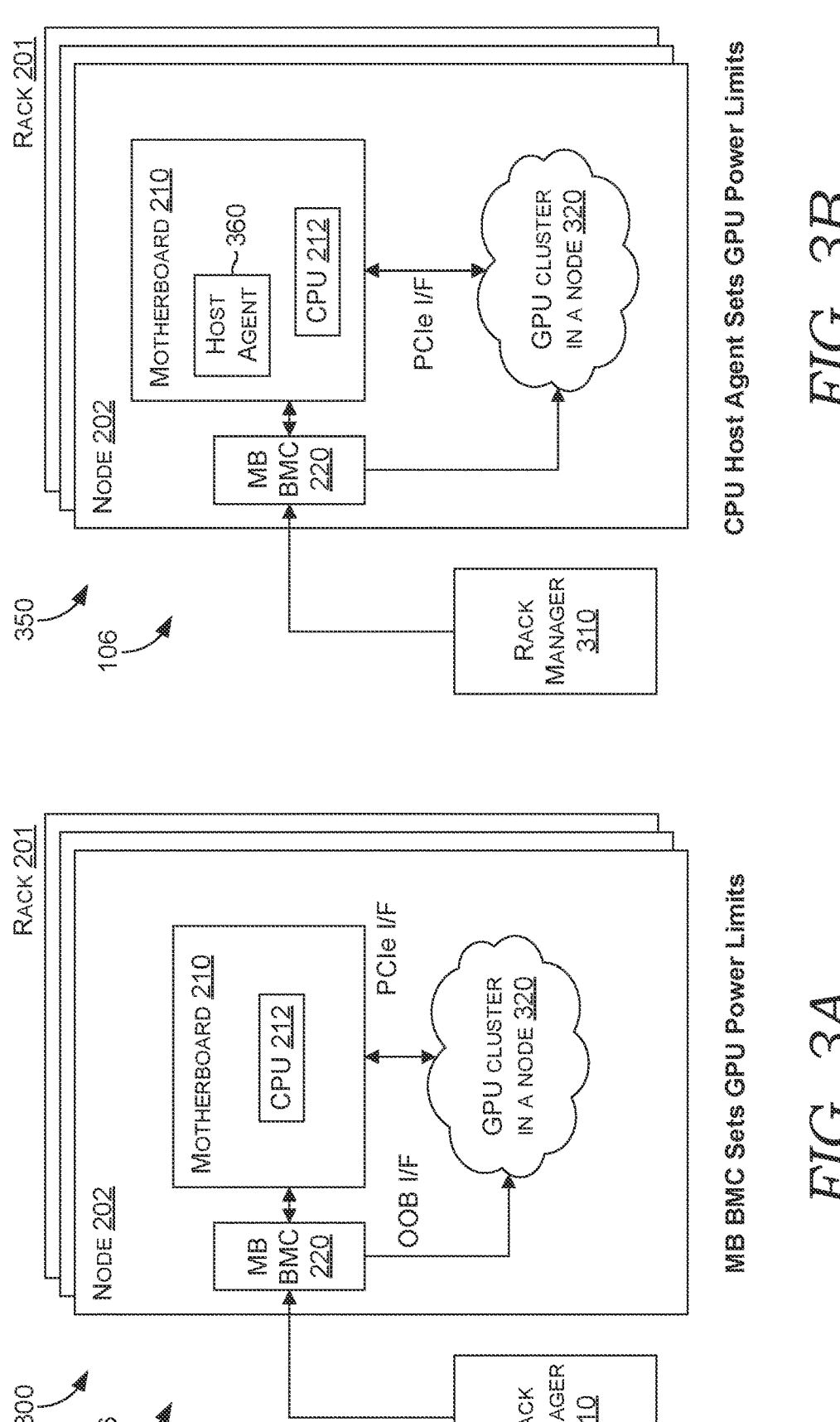
FIG. 3A is a block diagram of an example system including a node having a motherboard (MB) baseboard management controller (BMC) configured to control power based on a power policy limit, in accordance with an embodiment of the present disclosure.
FIG. 3B is a block diagram of an example system including a node having a host agent configured to control power based on a power policy limit, in accordance with an embodiment of the present disclosure.

Turning to FIG. 3A, depicted is a block diagram of an example system 300 including a node 202 having an MB BMC 220 configured to control power based on a power policy limit. In general, a data center can include a plurality of racks, such as rack 201, which in turn can include a plurality of nodes 202 tasked with performing task-specific workloads. In the context of artificial intelligence (AI), certain nodes 202 perform AI-based workloads, such as training or inference workloads, to name a few examples. The high computational resource utilization associated with performing these AI-based workloads may result in oversubscribing certain racks 201 while operating within power policy limits associated with a rack 201, as described herein. In general, a cluster 320 can include a collection of data center components (such as GPUs 230) across a distributed system. To efficiently perform computations across the distributed network, a cluster 320 can include GPUs that are specialized or tasked with performing certain tasks, such as the AI-based workloads described herein.

Continuing with FIG. 3A, the illustrated system 300 includes a rack manager 310 communicatively coupled to the node 202 via the MB BMC 220. In one embodiment, the rack manager 310 corresponds to a hardware processor that is rack-specific (for example, each rack 201 includes a corresponding rack manager 310) and determines the power policy limit. In a first example, the rack manager 310 determines an aggregate power output of the nodes 202 (such as all nodes 202) of the rack 201. Based on the aggregate power output of the nodes 202 of the rack exceeding a first power policy limit defining a maximum power for the rack 201, the rack manager 310 can communicate to the MB BMC 220 or any other component of the node 202 an indication of the rack power exceeding the first power policy limit of the rack. Additionally or alternatively, in one embodiment, the rack manager 310 communicates an indication of the first power policy limit to the MB BMC 220 or any suitable component of the node 202.

In a second example, the rack manager 310 determines a power output of the node 202 or a second power policy limit defining a maximum power for the node 202. Based on the power output of the node 202 of the rack exceeding the second power policy limit defining a maximum power for the node 202, the rack manager 310 can communicate to the MB BMC 220 or any other component of the node 202 an indication of the node power exceeding the second power policy limit of the node. Additionally or alternatively, in one embodiment, the rack manager 310 communicates an indication of the second power policy limit to the MB BMC 220 or any suitable component of the node 202.

In another example, when the rack manager 310 determines that the power output of the nodes 202 of the rack 201 is above the power policy limit (for example, the second power policy limits), the rack manager 310 determines individual power policy limits (for example, the second power policy limits) for each of the nodes 202. In this example, the rack manager 310 communicates the respective power policy limits to the respective MB BMCs 220 of each node. Continuing this example, the respective MB BMCs 220 determines and communicates the power policy limits (for example, third power policy limits) to individual GPUs 230 on the node 202 or within the cluster 320. In this example, a component of the node 202, such as the UBB BMC 280, throttles the GPUs 230 to comply with the third policy limits so that each GPU operates below or at respective third policy limits. In one embodiment, the MB BMC 220 communicates the power policy limits through the Out-of-Band interfaces (OOB I/F) like inter-integrated circuits (I2C), improved inter-integrated circuits (I3C), or management component transport protocol (MCTP).

Turning to FIG. 3B, depicted is a block diagram of an example system 250 including a node 202 having a host agent 360 configured to control power based on a power policy limit, in accordance with an embodiment of the present disclosure. As illustrated, system 350 includes rack 201 communicatively coupled to the rack manager 310. In one embodiment, the rack manager couples to the MB BMC 220 of the node 202 to throttle the GPUs 230 via any component of the motherboard 210, such as the host agent 360 or the CPU 212. As compared to system 300 of FIG. 3A, the example system 350 of FIG. 3B includes a motherboard 210 having a host agent 360. In one example, a host agent 360 refers to one or more software packages installed on the motherboard 210 to facilitate monitoring and management of any suitable components of the rack 201. In some embodiments, the host agent 360 performs tasks such as gathering data, analyzing the data, taking corrective action (for example, mitigating a security issue), managing credentials (for example, executing tasks like the configured domain name system (DNS) command to controlling credential management and block volume management), and/or running commands. In one instance, the host agent 360 communicates data indicative of potential security threats, performance issues, and other problems.

In certain embodiments of system 350, the host agent 360 of the motherboard 210 submits query requests to receive, from the MB BMC 220, power policy limits (for example, the first, second, or third policy limit) or the throttling order for the GPUs 230. In this manner, the MB BMC 220 can receive up-to-date power policy limits and indications of power consumption associated with running one or more workflows. In some embodiments, the MB BMC 220 determines, based on the power policy limit(s) and the power consumption associated with running the workflows, a throttling order for throttling the GPUs 230. Thereafter, embodiments of the host agent 360 reduces the computations or workloads performed by certain GPUs 230 to throttle the GPUs 230 based on the throttling order. In one embodiment, the GPUs 230 are throttled until the power consumption of the rack 201, the node 202, or the GPUs 230 are below or at the first, second, or third power policy limits.

Although certain embodiments of system 350 are discussed in the context of throttling accelerators, such as GPUs, it should be understood that the MB BMC 220 can also power cap the CPU 212 in the nodes 202 to reduce power consumption of the node 202 or rack 201. For example, in one embodiment, the MB BMC can throttle the CPU 212 to more quickly reduce power consumption to more quickly reduce the power of the node 202 to below a power policy limit.

Figure 4A:
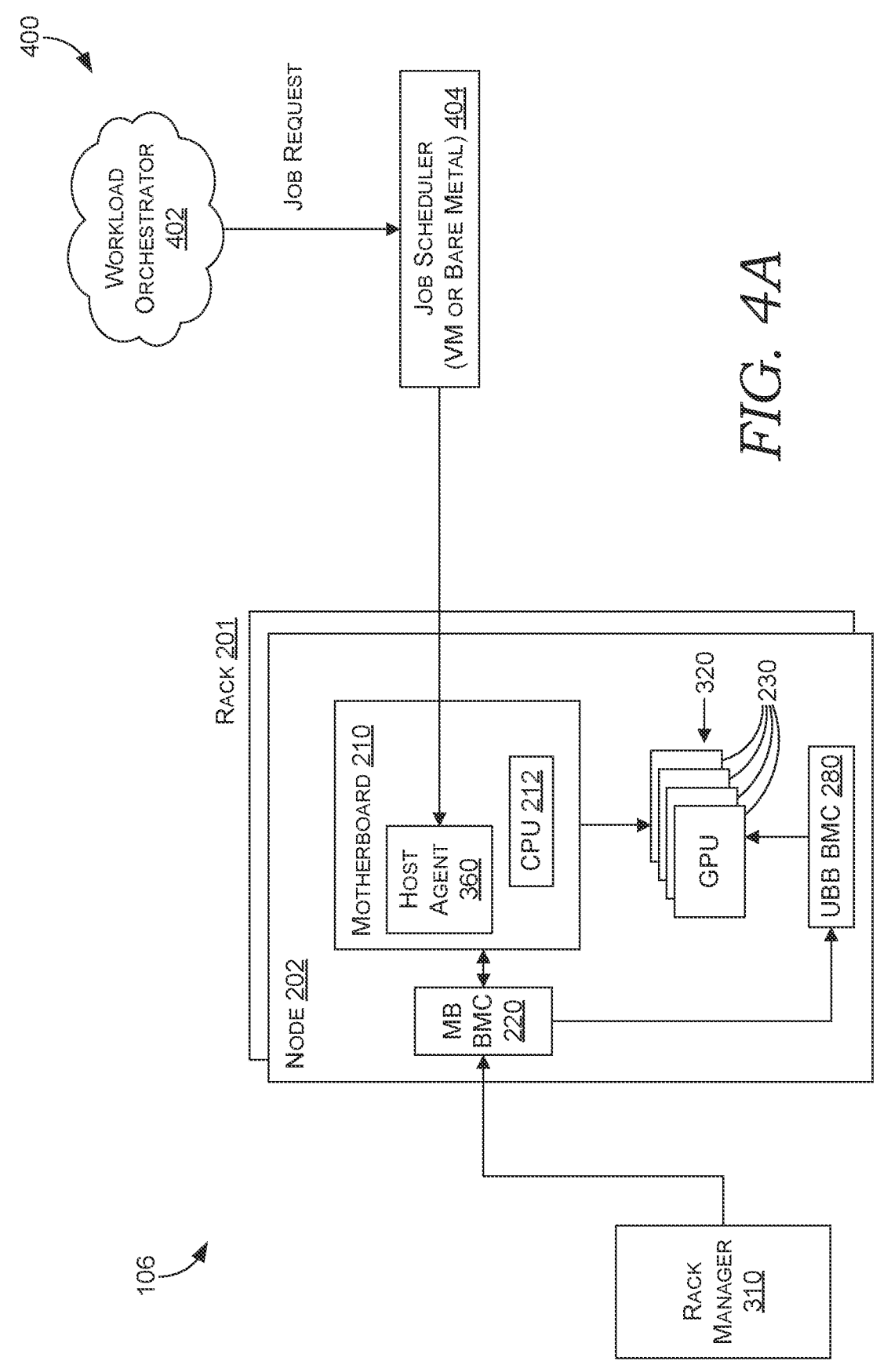
FIG. 4A is a block diagram of an example system including a node having an MB BMC configured to throttle at least one accelerator based on at least one service-level agreement (SLA) and a power policy limit, in accordance with an embodiment of the present disclosure.

FIG. 4A is a block diagram of an example system 400 having a rack 201 including a node 202 having an MB BMC 220 configured to control power based on at least one service-level agreement (SLA) and a power policy limit, in accordance with an embodiment of the present disclosure. The illustrated node 202 includes the motherboard 210 having the host agent 360 and the CPU 212; the cluster 320 including GPUs 230; and a UBB BMC 280. In one embodiment, one or more components of the node 202 are directly or indirectly communicatively coupled to at least one of the rack manager 310, the workload orchestrator 402, or the job scheduler 404.

In one example, the workload orchestrator 402 refers to distributed multi-tenant service, such as a software running on a hardware component, that provides unified service abstraction to run or orchestrate workflows across different customers. In one embodiment, the workload orchestrator 402 executes AI or ML workloads, such as the AI training and inference workloads discussed herein, as well as other suitable tasks. An example workload orchestrator includes Singularity or Slurm. For example, the workload orchestrator 402 creates, deploys, or monitors tasks or task execution within one or more VMs running on one or more coprocessors.

In some embodiments, the workload orchestrator 402 manages the capacity for system 400 to perform tasks, such as AI or ML workloads. In one example, the workload orchestrator 402 manages the capacity for any system, such as system 450 of FIG. 4B or example computing environment 900 of FIG. 9, to perform AI or ML workloads. In some embodiments, the workload orchestrator 402 receives tasks or workloads. For example, the workload orchestrator 402 receives tasks or workloads in the order they are submitted, received, or cached.

After receiving the tasks or workloads, embodiments of the workload orchestrator 402 determine any number of task parameters for the tasks. As a first example, the workload orchestrator 402 determines, for each task or at least one task, a first task parameter indicative of a computational resource requirement to run the workload. Continuing this example, the first task parameter includes a number of GPUs that are used to execute the task or workload, the power consumption associated with performing the task, or any suitable parameter indicative of computational resources used to execute the task. As a second example, the workload orchestrator 402 determines, for each task or at least one task, a second task parameter indicative of SLA parameters for the task. In one embodiment, the second task parameter is based on the SLA associated with the user account or group of customer accounts that submitted the task. Example second task parameters indicative of the SLA parameter include an indication of whether the task corresponds to a premium priority scheme, a standard priority scheme, a basic priority scheme, or any other priority scheme.

In some embodiments, the workload orchestrator 402 is communicatively coupled to the job scheduler 404. In one example, the job scheduler 404 refers to a computing component that monitors file movements within the system 400 and assigns the corresponding task to an agent, such as the illustrated host agent 360 for execution. For example, if a predetermined time of a task arrives or a triggering file reaches the job scheduler 404, the job scheduler 404 communicates to the host agent 360 a request to execute the preset task. In one embodiment, the workload orchestrator 402 communicates the task parameters (for example, the first task parameter indicative of a computational resource requirement to run the workload and the second task parameter indicative of SLA parameters for the task) to the job scheduler 404. In one embodiment, the job scheduler 404 receives the task parameters, and based on the task parameters, instructs the nodes 202 to create one or more virtual machine (VM) instances or Bare Metal instances. For example, the job scheduler 404 instructs the GPUs 230 of the node to run a VM instance equipped to execute the tasks.

As another example, the job scheduler 404 submits a request to the host agent 360 running on the node 202 to create the instance (VM or Bare Metal, or any other suitable tenant) for the task. For example, the host agent 360 performs Hyper-V virtualization to create one or more VMs using Hyper-V on a system running any suitable operating system, such as WINDOWS® or IOS®. In one embodiment, the instance includes at least one of a CPU 212, host memory (such as memory devices 812 of FIG. 9), or any number of GPUs 230 allocated for the task. In one embodiment, less computationally expensive tasks (such as AI inference, gaming, and the like) are assigned a subset of GPUs 230 attached to the node 202. In another embodiment, more computationally expensive tasks (such as AI training) are assigned all the GPUs 230 in the node 202.

In some embodiments, the job scheduler 404 communicates an SLA associated with the task to the host agent 360. The SLA received by the host agent 360 can define power-capping requirements for certain tasks submitted from certain users. Certain tasks and their corresponding SLA parameters are communicated to the host agent 360. Based on the SLA parameters, embodiments of the host agent 360 determine power-capping requirements. In a first example, based on the SLA parameters of the task indicating a premium priority scheme, the host agent 360 determines no preemption and no power throttling for the task. In a second example, based on the SLA parameters of the task indicating a standard priority scheme, the host agent 360 determines infrequent preemption and infrequent power throttling. In this example, the infrequent preemption and infrequent power throttling indicates that (1) the task having a standard priority scheme is throttled more than or before a task having a premium priority scheme and that (2) the task having the standard priority scheme is throttled less than or after a task having a basic priority scheme. In a third example, based on the SLA parameters of the task indicating a basic priority scheme, the host agent 360 determines frequent preemption and full-power throttling (when power consumption exceeds the power policy limit).

In addition or alternative to the aforementioned three example priority schemes, embodiments of the SLA parameters include an indication of whether the task is classified as a production task or as a non-production task running on the node 202. In some embodiments, the host agent 360 and/or the workload orchestrator 402 access a schema table that maps the task types to a throttling order scheme. One example schema table stored on system 400 and accessible to the host agent 360 and/or the workload orchestrator 402 is illustrated in Table 1.

TABLE 1

| SLA-Based Throttling Order Table in the Host. | | |
|---|---|---|
| Job Type | Deployment Type | Throttling order |
| Basic | Non-Production | 0 |
| | Production | 1 |
| Standard | Non-Production | 2 |
| | Production | 3 |
| Premium | Non-Production | 4 |
| | Production | Not throttled |

Based on the request from the job scheduler 404 to execute a particular task, the host agent 360 (for example, using Hyper-V) may allocate to each VM a CPU, system memory, and GPUs 230. In one embodiment, the request from the job scheduler 404 includes the SLA of the task(s)

included in the request. In one embodiment, the host agent 360 determines a throttling order. In one embodiment, the host agent 360 communicates to the MB BMC 220 the throttling order of the task and the identification number (ID) of the GPU 230 assigned to the particular VM or task. For example, the MB BMC 220 generates a command that causes the host agent 360 to determine and communicate to the MB BMC 220 the throttling order and the corresponding ID of the GPU 230. An example command includes "Set GPU SLA Mapping," and is formatted in any suitable format, such as IPMI or REDFISH®.

In one embodiment, the MB BMC 220 receives the throttling order and the ID of the corresponding GPUs 230 and stores the information in a database as associated entries of a table. The table can map the list of GPU devices allocated to the various tasks in the node and their corresponding throttling order. In one embodiment, the GPUs 230 are ranked based on their respective throttling order, such that GPUs 230 having a lower throttling order value are throttled before those having a higher value, as defined by their respective SLAs. In one embodiment, the MB BMC 220 generates a table during workload allocation. An example of such a table is illustrated in Table 2 below.

TABLE 2

| An Example GPU Throttling Table in MB BMC | |
|---|---|
| Throttling Order | List of GPUs |
| 0 | (GPU1, GPU2) |
| 1 | (GPU3) |
| 2 | None |
| 3 | (GPU4) |
| 4 | None |
| Not throttled | (GPU5, GPU6, GPU7) |

The MB BMC 220 stores a ranked listing of GPUs based on their respective throttling orders. Example Table 2 lists the GPUs in throttling order from lowest to highest, such that the GPUs 230 with the lowest throttling order value are throttled before GPUs 230 having a higher throttling order value. For example, GPU1 and GPU2 have a throttling order value of 0, such that GPU1 and GPU2 are throttled before GPU3, having a throttling order value of 1. In example Table 2, GPU5, GPU6, and GPU7 are not throttled based on their throttling order value (determined based on the SLA of the task assigned to these GPUs and/or of the corresponding user account).

In some embodiments, the rack manager 310 determines the power consumption for the rack 201 and compares the power consumption to the power policy (ies) discussed herein. When the rack manager 310 determines that the power of the rack 201 exceeds the power policy limit (for example, the first power policy limit described herein), embodiments of the rack manager 310 generate an indication that the rack 201 is overprovisioned for power. In one embodiment, the indication that the rack 201 is overprovisioned for power, rack manager 310 generates corresponding power policy limits (for example, the second power policy limit described herein) for each node 202. In one embodiment, the rack manager 310 communicates the corresponding power policy limits to the MB BMC 220 of the corresponding node 202. For example, the rack manager 310 writes the second power policy limit to the MB BMC 220 using a command, such as "Set Power Cap Policy." The command can be in any suitable format, such as IPMI.

In some embodiments, the power policy limit corresponds to a static allocation of power. In one example, a static allocation of power refers to every node 202 of the rack 201 being allocated the same power policy limit irrespective of the tasks running on the node. However, in some embodiments, the power policy limit for the node corresponds to a dynamic allocation of power. In one example, a dynamic allocation of power refers to different power policy limits being assigned to different nodes based on the combined workloads or tasks being performed by certain nodes. For example, nodes having combined workloads indicative of high-priority tasks be assigned a higher policy limit than nodes having a combined workload indicative of lower priority tasks.

In some embodiments, the rack manager 310 determines the first power policy limit indicative of a maximum power for the rack 201. In some embodiments, the rack manager 310 determines the second power policy limit indicative of a maximum power for the node 202. The rack manager 310 communicates the second power policy limit to the MB BMC 220 to distribute power across the various components of the node 202, such as the CPU 212, GPUs 230, and other components illustrated and not illustrated in FIG. 4A (such as accelerators, including FPGAs, and the like).

In some embodiments, the MC BMC 220 or the rack manager 310 determines power consumption of the node 202. In one example, the power consumption of the node is determined by obtaining power readings from each component of the node 202. For example, suppose that the node includes only one or more CPUs, one or more GPUs, and one or more FPGAs. In this example, the power consumption of the node is calculated using equation 1 below:

$$\text{Node power consumption} = \qquad (1)$$
$$SUM \ (CPU \ \text{domain} + GPU \ \text{domain} + FPGA \ \text{domain}),$$

where the CPU domain is the power consumed by the CPU; the GPU domain is the power consumed by the GPU; and the FPGA domain is the power consumed by the FPGA.

Thereafter, in one embodiment, the MC BMC 220 compares (1) the node power consumption (determined based on equation 1, for example) of the components of the node 202 and (2) the second power policy limit. If the node power consumption is greater than the power policy limit, then embodiments of the MC BMC apply a throttling on at least one of the domains used to calculate the node power consumption.

As a first example associated with the GPU domain, the MB BMC 220 throttles the components associated with the GPU domain, such as the GPUs 230, based on the throttling order, such as that illustrated in Tables 2 and 3 (provided below). In one embodiment, the MB BMC 220 throttles the GPUs 230 based on the throttling order, such that the GPUs having the lowest priority, as indicated by the lowest throttling order value, are throttled first and before the GPUs having a higher priority, as indicated by the higher throttling order value. The MB BMC 220 iteratively continues to throttle the components based on the throttling order (as illustrated in example Tables 1 and 2) until the node power consumption is at or below the second power policy limit. By throttling the GPUs 230 based on the SLA requirements, embodiments of the present disclosure ensure that the tasks associated with the highest priority based on the SLA are rarely throttled so that the rack 201 can continue to satisfy customer SLAs. Any suitable algorithm such as the algorithm below can be employed by a component of system 450, such as the MB BMC 220 to throttle the GPUs 230.

> Algorithm: Current_order = 0
>
> While (total *GPU* power consumption > total *GPU* power budget)
>
> Throttle *GPUs* with throttling order == Current_order
>
> Current_order = Current_order + 1
>
> Repeat In one embodiment where the node 202 includes discrete GPUs 230, as illustrated in FIG. 2A, the MB BMC 220 directly reduces the power of the individual GPUs 230 or directly throttles the individual GPUs 230 based on the throttling order. For example, the MB BMC 220 throttles the GPUs via commands sent through any suitable interface, such as Out-of-Band I2C/I3C/MCTP interfaces.

In one embodiment where the node 202 includes a UBB 270, as illustrated in FIG. 2B, the MB BMC 220 communicates the power-capping request based on the throttling order to the UBB BMC 280. In this example, the UBB BMC 280 reduces the power of the individual GPUs 230 or directly throttles the individual GPUs 230 based on the throttling order. For example, the UBB BMC 280 applies the power capping to the individual GPU slots or OAMs by writing in the power cap limit using any suitable command. An example command includes "Set Power Cap Limit," written directly to the GPUs 230 in IPMI or REDFISH®.

Figure 4B:
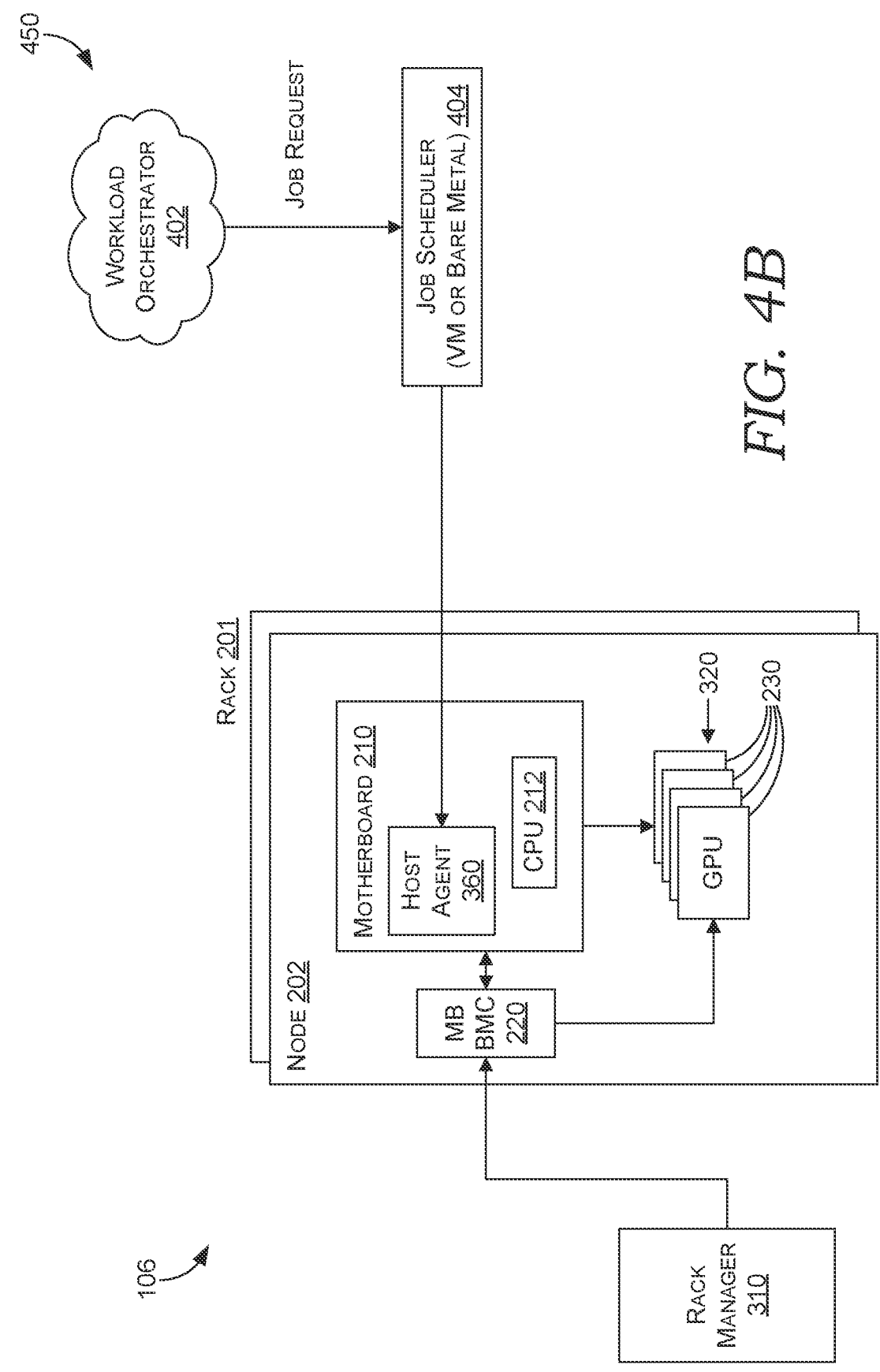
FIG. 4B is a block diagram of an example system including a node having a host agent configured to throttle at least one accelerator based on at least one SLA and a power policy limit, in accordance with an embodiment of the present disclosure.

Turning to FIG. 4B, depicted is a block diagram of an example system including a node 202 having a host agent 360 that controls power based on at least one SLA or a power policy limit, in accordance with an embodiment of the present disclosure. As discussed herein, certain embodiments of the workload orchestrator 402 and/or the job scheduler 404 receive tasks, orchestrate or run VMs, and assign the tasks to VM implemented by one or more accelerators, such as the illustrated cluster 320 of GPUs 230. In one embodiment, the host agent 360, which can implement a Hyper-V, allocates the VM to one or more GPUs 230 based on the request from the job scheduler 404. For example, the host agent 360 launches the VMs and allocates the requested number of GPU devices to the task or workload based on availability of GPUs 230. In one embodiment, the host agent 360 accesses a list of GPUs 230, corresponding availabilities or statuses, or corresponding slot IDs for the GPUs.

After allocating the task to the GPU 230, embodiments of the host agent 360 update the throttling order based on the task assigned to the GPUs 230. For example, updating the throttling order includes adding the GPU device IDs corresponding to certain tasks into a throttling order table. An example throttling order table is depicted below as Table 3. In one embodiment, the host agent generates, updates, and maintains the throttling order table:

TABLE 3

| An Example GPU SLA Throttling Table in Host Agent | | | |
|---|---|---|---|
| VM/Job | SLA | Throttling Order | List of GPUs |
| Job1 | Basic | 0 | (GPU1, GPU2) |
| Job4 | Standard | 1 | (GPU3) |
| | | 2 | None |

TABLE 3-continued

| | An Example GPU SLA Throttling Table in Host Agent | | |
| --- | --- | --- | --- |
| VM/Job | SLA | Throttling Order | List of GPUs |
| Job3 | Standard | 3 | (GPU4) |
| | | 4 | None |
| Job2 | Premium | Not throttled | (GPU5, GPU6, GPU7) |

As described with respect to FIG. 4A, the rack manager 310 of FIG. 4B determines individual node power policy limits (for example, the second power policy limit). In one embodiment, the rack manager 310 communicates this power policy limit to the node 202, for example, by writing the second power policy limit to the MB BMC 220 using any suitable command. An example command includes "Set Power Cap Policy," using IPMI. Thereafter, embodiments of the MB BMC 220 distribute power across the various key components of the node 202, such as the CPU 212, GPUs 230, and other components illustrated and not illustrated in FIG. 4B (such as other accelerators, including FPGAs, and the like). In one example, the power consumption of the node 202 is calculated using equation 1 above.

In some embodiments, the host agent 360 periodically or at random queries or polls the MB BMC 220 to determine updates made to the power policy limit (for example, the second power policy limit) of the node 202. Additionally or alternatively, embodiments of the host agent 360 query or poll the power consumed by all the individual GPUs 230 in the node 202. Thereafter, embodiments of the host agent 360 compare the power consumption of each GPU against the power policy set by the MB BMC 220.

By way of example, suppose that the host agent 360 polls the MB BMC 220 and determines that the aggregate power consumption of all the GPUs 230 of node 202 exceeds the power policy limit. In this example, the host agent 360 throttles the GPUs 230 based on the throttling order. The throttling order can be generated by the MB BMC 220 and communicated to the host agent 360, for example, as a data structure, such as a database containing a table similar to Table 3, for example. In one embodiment, the host agent 360 throttles the GPUs 230 based on the throttling order, such that the GPUs having the lowest priority, as indicated by the lowest throttling order value, are throttled first and before the GPUs having a higher priority, as indicated by the higher throttling order value. The host agent 360 iteratively continues to throttle the components based on the throttling order (as illustrated in example Tables 1, 2, or 3) until the node power consumption is at or below the second power policy limit.

Figure 7:
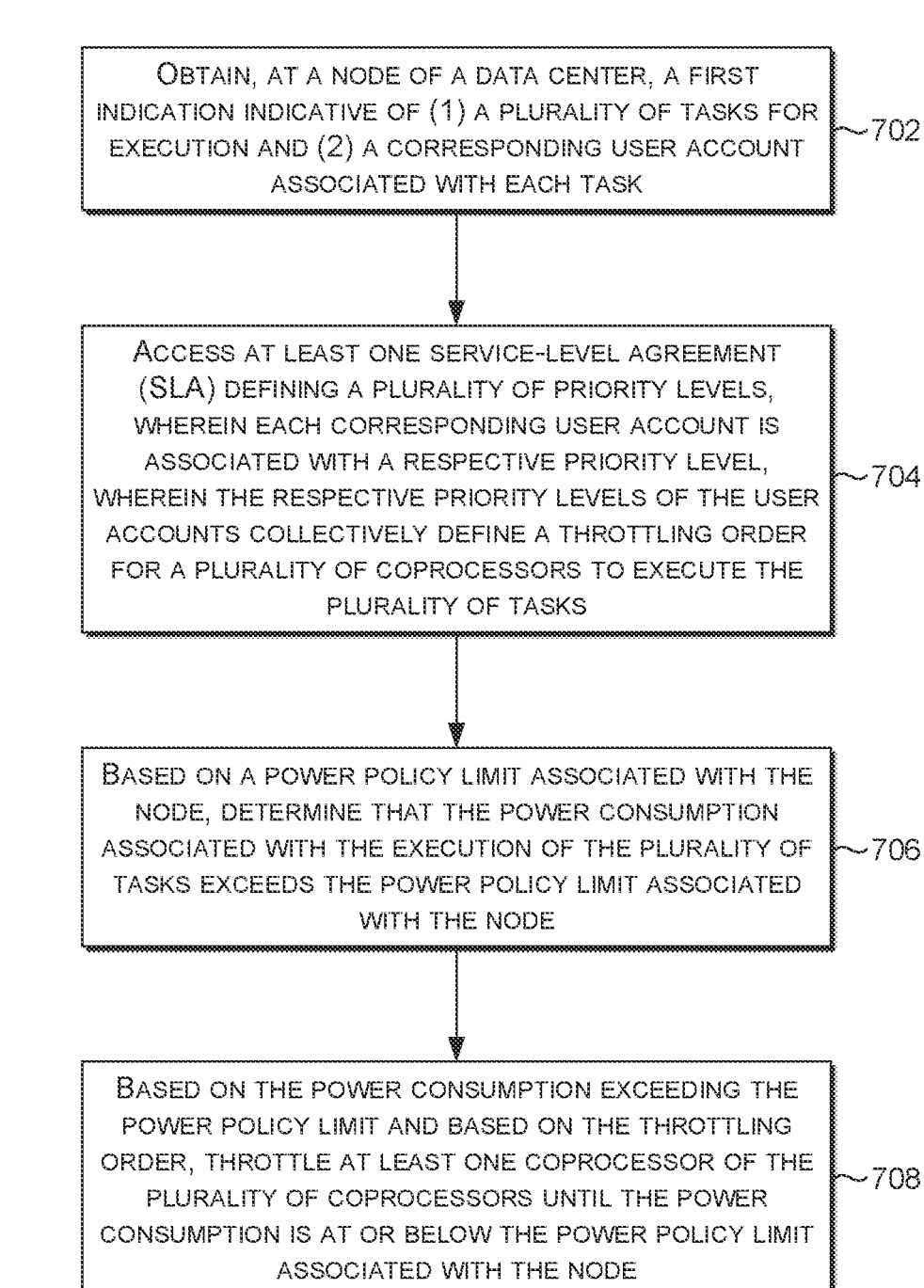
FIG. 7 depicts a flow diagram of a method for throttling at least one coprocessor of the plurality of coprocessors until the power consumption is at or below the power policy limit associated with the node, in accordance with an embodiment of the present disclosure.

Turning now to FIGS. 5, 6, and 7, aspects of example process flows 500, 600, and 700 are illustratively depicted for some embodiments of the disclosure. Embodiments of process flows 500, 600, and 700 each comprise a method (sometimes referred to herein as method 500, 600, and 700) carried out to implement various example embodiments described herein. For instance, at least one of process flow 500, 600, and 700 is performed to throttle at least one accelerator, such as the GPUs and FPGAs discussed herein, until the power consumption is at or below the power policy limit associated with the node, which is used to provide any of the improved electronic technology or enhanced user computing experiences described herein.

Each block or step of process flow 500, process flow 600, process flow 700, and other methods described herein comprises a computing process performed using any combination of hardware, firmware, and/or software. For instance, various functions are carried out by a processor executing instructions stored in memory, such as memory 812 as described in FIG. 8. Embodiments of the methods can also be embodied as computer-usable instructions stored on computer storage media. Embodiments of the methods are provided by a standalone application, a service or hosted service (standalone or in combination with another hosted service), or a plug-in to another product, to name a few. For example, the blocks of process flow 500, 600, and 700 that correspond to actions (or steps) to be performed (as opposed to information to be processed or acted on) are carried out by one or more computer applications or services, in some embodiments, which operate on one or more user devices (such as user devices 102a and 102b through 102n of FIG. 1), and/or are distributed across multiple user devices, and/or servers, or by a distributed computing platform, and/or are implemented in the cloud, such as is described in connection with FIGS. 2A, 2B, 3A, 3B, 4A, and 4B. In some embodiments, the functions performed by the blocks or steps of process flows 500, 600, and 700 are carried out by components of systems 200, 250, 300, 350, 400, or 450, as described in FIGS. 2A, 2B, 3A, 3B, 4A, and 4B, respectively.

With reference to FIG. 5, aspects of example process flow 500 are illustratively provided for throttling the at least one GPU of the plurality of GPUs until the power consumption is at or below the power policy limit associated with the node, in accordance with an embodiment of the present disclosure. As illustrated, at block 502, example process flow 500 includes obtaining, at the node of the system, a first indication indicative of (1) a plurality of tasks for execution and (2) a corresponding user account associated with each task. At block 504, example process flow 500 includes accessing a plurality of computer resource allocation parameters defining a plurality of priority levels. In one embodiment, each corresponding user account is associated with a respective priority level. In one embodiment, the respective priority levels of the user accounts collectively define the throttling order for a plurality of GPUs to execute the plurality of tasks. At block 506, example process flow 500 includes determining, based on the power policy limit associated with the node, that the power consumption associated with the execution of the plurality of tasks exceeds the power policy limit associated with the node. At block 508, example process flow 500 includes throttling, based on the power consumption exceeding the power policy limit and based on the throttling order, the at least one GPU of the plurality of GPUs until the power consumption is at or below the power policy limit associated with the node.

With reference to FIG. 6, aspects of example process flow 600 are illustratively provided for throttling at least one coprocessor of the plurality of coprocessors until the power consumption is at or below the power policy limit associated with the node, in accordance with an embodiment of the present disclosure. At block 602, example process flow 600 includes obtaining, at a node of a rack, a first indication indicative of (1) a plurality of tasks for execution and (2) a corresponding user account associated with each task. At block 604, example process flow 600 includes accessing at least one service-level agreement (SLA) defining a plurality of priority levels. In one embodiment, each corresponding user account is associated with a respective priority level. In one embodiment, the respective priority levels of the user accounts collectively define a throttling order for a plurality of coprocessors to execute the plurality of tasks. At block 606, example process flow 600 includes determining, based on a power policy limit associated with the node, that the power consumption associated with the execution of the plurality of tasks exceeds the power policy limit associated with the node. At block 608, process flow 600 includes throttling, based on the power consumption exceeding the power policy limit, and based on the throttling order, at least one coprocessor of the plurality of coprocessors until the power consumption is at or below the power policy limit associated with the node.

With reference to FIG. 7, aspects of example process flow 700 are illustratively provided for throttling at least one coprocessor of the plurality of coprocessors until the power consumption is at or below the power policy limit associated with the node, in accordance with an embodiment of the present disclosure. At block 702, example process flow 700 includes obtaining, at a node of a data center, a first indication indicative of (1) a plurality of tasks for execution and (2) a corresponding user account associated with each task. At block 704, example process flow 700 includes accessing at least one service-level agreement (SLA) defining a plurality of priority levels. In one embodiment, each corresponding user account is associated with a respective priority level. In one embodiment, the respective priority levels of the user accounts collectively define a throttling order for a plurality of coprocessors to execute the plurality of tasks. At block 706, example process flow 700 includes determining, based on a power policy limit associated with the node, that the power consumption associated with the execution of the plurality of tasks exceeds the power policy limit associated with the node. At block 708, example process flow 700 includes throttling, based on the power consumption exceeding the power policy limit, and based on the throttling order, at least one coprocessor of the plurality of coprocessors until the power consumption is at or below the power policy limit associated with the node.

Other Embodiments

In some embodiments, a system, such as the computerized system described in any of the embodiments above, comprises at least one computer processor and computer storage media storing computer-useable instructions that, when used by the at least one computer processor, cause the system to perform operations. The operations comprise obtaining, at the node of the system, a first indication indicative of (1) a plurality of tasks for execution and (2) a corresponding user account associated with each task. The operations further comprise accessing a plurality of computer resource allocation parameters defining a plurality of priority levels. Each corresponding user account is associated with a respective priority level. The respective priority levels of the user accounts collectively define the throttling order for a plurality of GPUs to execute the plurality of tasks. The operations further comprise, based on the power policy limit associated with the node, determining that a power consumption associated with the execution of the plurality of tasks exceeds the power policy limit associated with the node. The operations further comprise, based on the power consumption exceeding the power policy limit and based on the throttling order, throttling the at least one GPU of the plurality of GPUs until the power consumption is at or below the power policy limit associated with the node.

In any combination of the above embodiments of the system, throttling the at least one GPU comprises reallocating resources from (1) a first virtual machine assigned to a first set of tasks of the plurality of tasks to (2) a second virtual machine assigned to a second set of tasks of the plurality of tasks, wherein the first set of tasks is associated with a user account having a priority level that is lower than a priority level of a user account associated with the second set of tasks.

In any combination of the above embodiments of the system, throttling the at least one GPU comprises shutting down a virtual machine assigned to a first set of tasks of a plurality of tasks, wherein the first set of tasks is associated with a user account having a priority level that is lower than a priority level of a user account associated with a second set of tasks of the plurality of tasks.

In any combination of the above embodiments of the system, throttling the at least one GPU comprises at least one of: lowering a frequency or lowering a voltage of the at least one GPU.

In any combination of the above embodiments of the system, determining the throttling order comprises accessing at least one service-level agreement (SLA) defining the plurality of computer resource allocation parameters. Determining the throttling order comprises, for each task of the plurality of tasks, determining the corresponding user account and assigning a corresponding task of the plurality of tasks to one or more GPUs of the plurality of GPUs and determining, from the SLA, a priority level of each user account, each priority level of the plurality of priority levels associated with a throttling order value. Determining the throttling order comprises ranking the plurality of GPUs based on the throttling order value of the corresponding user account associated with a task to be executed by a corresponding GPU, such that a highest ranked or lowest ranked GPU is first to be throttled based on the power consumption exceeding the power policy limit.

In any combination of the above embodiments of the system, the power policy limit comprises at least one of: a first power policy limit defining a maximum power for a rack comprising the node, wherein a rack manager of the rack compares the power of the rack against the first power policy limit; a second power policy limit defining a maximum power for the node, wherein a motherboard (MB) baseboard management controller (BMC) compares the power of the node against the second power policy limit; or a third power policy limit defining a maximum power for a set of GPUs of the node. A universal baseboard (UBB) BMC compares the power of the set of GPUs against the third power policy limit. The power consumption exceeds the power policy limit when (1) a power output of the rack exceeds the maximum power defined by the first power policy limit, (2) a power output of the node exceeds the maximum power defined by the second power policy limit, or (3) a power output of the set of GPUs exceeds the maximum power defined by the third power policy limit.

In any combination of the above embodiments of the system, the operations further comprise: assigning each task of the plurality of tasks to a corresponding GPU of the plurality of GPUs based on availability of the corresponding GPU and a computational resource consumption associated with the task. Each GPU of the plurality of GPUs is throttled based on the priority level of a user account associated with the task that is assigned to a respective GPU.

In any combination of the above embodiments of the system, throttling the at least one GPU comprises at least one of: causing a rack manager to distribute power within a rack comprising the node until the power consumption is equal to or less than the power policy limit associated with the node; causing an MB BMC to distribute power within the node or among the plurality of GPUs until the power consumption is equal to or less than the power policy limit associated with the node; or causing a UBB BMC to distribute power among the plurality of GPUs until the power consumption is equal to or less than the power policy limit associated with the node.

In any combination of the above embodiments of the system, a first GPU assigned a first task associated with a first user account having a lower priority level is throttled before a second GPU assigned a second task associated with a second user account having a higher priority level.

In any combination of the above embodiments of the system, throttling the at least one GPU of the plurality of GPUs comprises iteratively throttling a set of GPUs of the plurality of GPUs until the power consumption is at or below the power policy limit.

Various embodiments are directed to computer-implemented methods comprising the following operations: obtaining, at a node of a rack, a first indication indicative of (1) a plurality of tasks for execution and (2) a corresponding user account associated with each task; accessing at least one service-level agreement (SLA) defining a plurality of priority levels, wherein each corresponding user account is associated with a respective priority level, wherein the respective priority levels of the user accounts collectively define a throttling order for a plurality of coprocessors to execute the plurality of tasks; based on a power policy limit associated with the node, determining that a power consumption associated with the execution of the plurality of tasks exceeds the power policy limit associated with the node; and based on the power consumption exceeding the power policy limit and based on the throttling order, throttling at least one coprocessor of the plurality of coprocessors until the power consumption is at or below the power policy limit associated with the node.

In any combination of the above embodiments of the computer-implemented method, a coprocessor executing a task executed in a production environment is associated with a higher priority level than a coprocessor executing the task in a non-production environment, wherein the task executed in the non-production environment is throttled before the task executed in the production environment.

In any combination of the above embodiments of the computer-implemented method, the plurality of tasks are associated with an artificial intelligence (AI) workload.

In any combination of the above embodiments of the computer-implemented method, the first indication is obtained from a workflow orchestrator configured to create, deploy, or monitor a virtual machine on the at least one coprocessor based on the plurality of tasks.

In any combination of the above embodiments of the computer-implemented method, the at least one coprocessor comprises at least one of: a graphics processing unit (GPU), a field-programmable gate array (FPGA), or an application-specific integrated circuit (ASIC).

In any combination of the above embodiments of the computer-implemented method, the power policy limit associated with the node is the same across every node of the rack.

Various embodiments are directed to one or more computer storage media having computer-executable instructions embodied thereon that, when executed, by one or more processors, cause the one or more processors to perform operations. The operations include obtaining, at a node of a data center, a first indication indicative of (1) a plurality of tasks for execution and (2) a corresponding user account associated with each task. The operations include accessing at least one service-level agreement (SLA) defining a plurality of priority levels. Each corresponding user account is associated with a respective priority level. The respective priority levels of the user accounts collectively define a throttling order for a plurality of coprocessors to execute the plurality of tasks. The operations include, based on a power policy limit associated with the node, determining that a power consumption associated with the execution of the plurality of tasks exceeds the power policy limit associated with the node. The operations include, based on the power consumption exceeding the power policy limit and based on the throttling order, throttling at least one coprocessor of the plurality of coprocessors until the power consumption is at or below the power policy limit associated with the node.

In any combination of the above embodiments of the one or more computer storage media, throttling the at least one coprocessor comprises reallocating resources from (1) a first virtual machine assigned to a first set of tasks of the plurality of tasks to (2) a second virtual machine assigned to a second set of tasks of the plurality of tasks. The first set of tasks is associated with a user account having a priority level that is lower than a priority level of a user account associated with the second set of tasks.

In any combination of the above embodiments of the one or more computer storage media, throttling the at least one coprocessor comprises shutting down a virtual machine assigned to a first set of tasks of a plurality of tasks. The first set of tasks is associated with a user account having a priority level that is lower than a priority level of a user account associated with a second set of tasks of the plurality of tasks.

In any combination of the above embodiments of the one or more computer storage media, throttling the at least one coprocessor comprises at least one of: causing a rack manager to distribute power within a rack comprising the node until the power consumption is equal to or less than the power policy limit associated with the node; causing an MB BMC to distribute power within the node or among the plurality of coprocessors until the power consumption is equal to or less than the power policy limit associated with the node; or causing a UBB BMC to distribute power among the plurality of coprocessors until the power consumption is equal to or less than the power policy limit associated with the node.

Example Computing Environments

Figure 8:
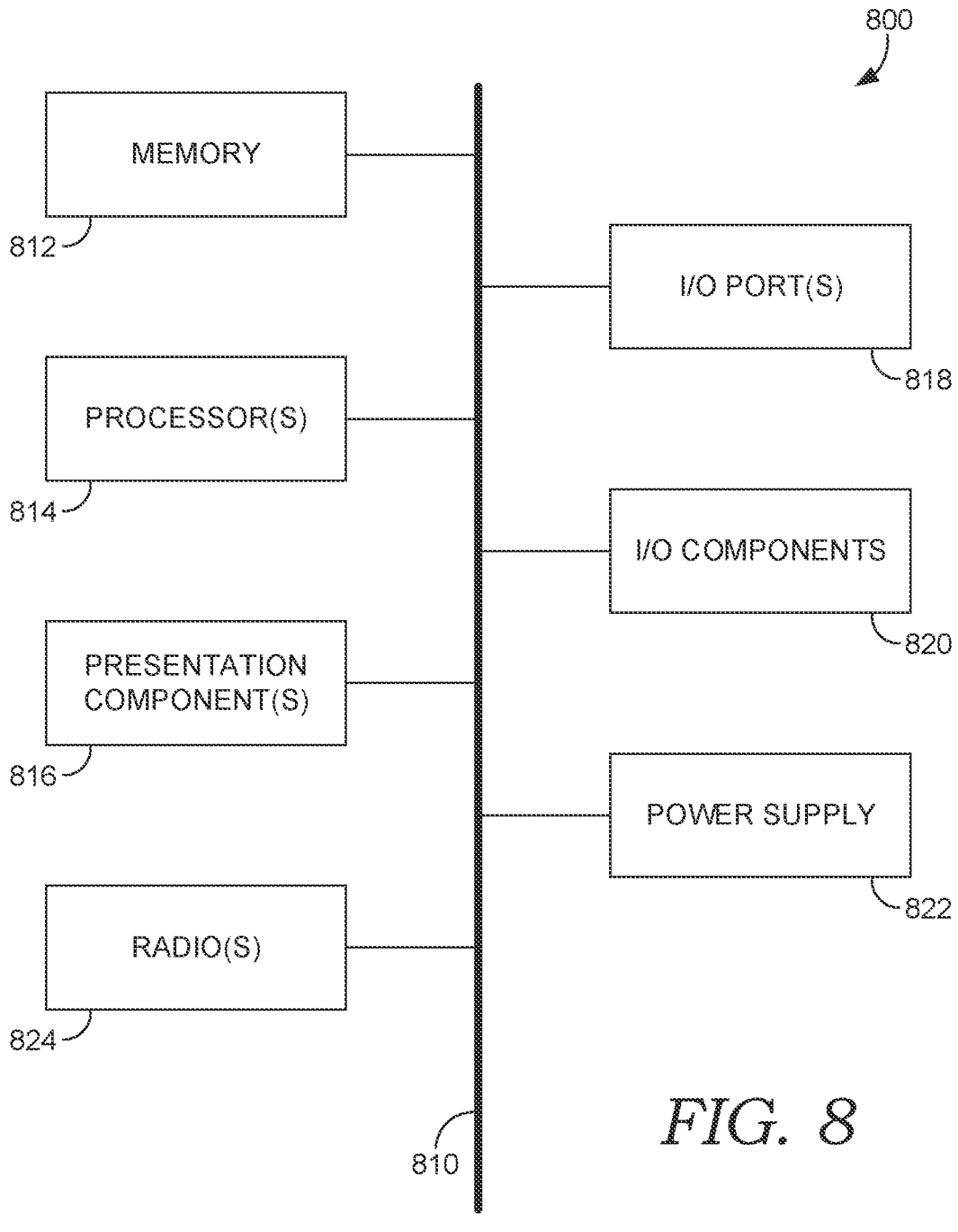
FIG. 8 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 8 and 9, respectively. With reference to FIG. 8, an example computing device is provided and referred to generally as computing device 800. The computing device 800 is but one example of a suitable computing environment and is not intended to suggest any limitation as to the scope of use or functionality of embodiments of the disclosure, and nor should the computing device 800 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low-level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated within the embodiments of the present disclosure.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. In one example, bus 810 represents one or more buses (such as an address bus, data bus, or combination thereof). Although the various blocks of FIG. 8 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 8 is merely illustrative of an example computing device that can be used in connection with one or more embodiments of the present disclosure. Distinction is not made between such categories as "workstation," "server," "laptop," or "handheld device," as all are contemplated within the scope of FIG. 8 and with reference to "computing device."

Computing device 800 typically includes a variety of computer-readable media. Computer-readable media can be any available media that can be accessed by computing device 800 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 812 includes computer storage media in the form of volatile and/or non-volatile memory. In one example, the memory is removable, non-removable, or a combination thereof. Hardware devices include, for example, solid-state memory, hard drives, and optical-disc drives. Computing device 800 includes one or more processors 814 that read data from various entities such as memory 812 or I/O components 820. As used herein and in one example, the term processor or "a processer" refers to more than one computer processor. For example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor are performed by more than one processor.

Presentation component(s) 816 presents data indications to a user or other device. Presentation components include, for example, a display device, speaker, printing component, vibrating component, and the like.

The I/O ports 818 allow computing device 800 to be logically coupled to other devices, including I/O components 820, some of which are built-in. Illustrative components include a microphone, joystick, game pad, satellite dish, scanner, printer, or a wireless device. The I/O components 820 can provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. In one example, the computing device 800 is equipped with depth cameras, such as stereoscopic camera systems, infrared camera systems, red-green-blue (RGB) camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 include one or more radio(s) 824 (or similar wireless communication components). The radio transmits and receives radio or wireless communications. Example computing device 800 is a wireless terminal adapted to receive communications and media over various wireless networks. Computing device 800 may communicate via wireless protocols, such as code-division multiple access ("CDMA"), Global System for Mobile ("GSM") communication, or time-division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a wireless local area network (WLAN) connection using the 802.11 protocol; a Bluetooth connection to another computing device is a second example of a short-range connection, or a near-field communication connection. A long-range connection may include a connection using, by way of example and not limitation, one or more of code-division multiple access (CDMA), General Packet Radio Service (GPRS), Global System for Mobile Communication (GSM), time-division multiple access (TDMA), and 802.16 protocols.

Referring now to FIG. 9, an example distributed computing environment 900 is illustratively provided, in which implementations of the present disclosure can be employed. In particular, FIG. 9 shows a high-level architecture of an example cloud computing platform 910 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 900 that includes cloud computing platform 910, rack 920, and node 930 (for example, computing devices, processing units, or blades) in rack 920. The technical solution environment can be implemented with cloud computing platform 910, which runs cloud services across different data centers and geographic regions. Cloud computing platform 910 can implement the fabric controller 940 component for provisioning and managing resource allocation, deployment, upgrade, and management of cloud services. Typically, cloud computing platform 910 acts to store data or run service applications in a distributed manner. Cloud computing platform 910 in a data center can be configured to host and support operation of endpoints of a particular service application. In one example, the cloud computing platform 910 is a public cloud, a private cloud, or a dedicated cloud.

Node 930 can be provisioned with host 950 (for example, operating system or runtime environment) running a defined software stack on node 930. Node 930 can also be configured to perform specialized functionality (for example, computer nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a multi-tenant infrastructure or tenancy. The terms "service application," "application," or "service" are used interchangeably with regards to FIG. 9, and broadly refer to any software, or portions of software, that run on top of, or access storage and computing device locations within, a datacenter.

When more than one separate service application is being supported by nodes 930, certain nodes 930 are partitioned into virtual machines (for example, virtual machine 952 and virtual machine 954). Physical machines can also concurrently run separate service applications. The virtual machines or physical machines can be configured as individualized computing environments that are supported by resources 960 (for example, hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 980 is linked to a service application in cloud computing platform 910. Client device 980 may be any type of computing device, such as user device 102 or 230 described with reference to FIGS. 1 and 2, respectively, and the client device 980 can be configured to issue commands to cloud computing platform 910. In embodiments, client device 980 communicates with service applications through a virtual Internet Protocol (IP) and load balancer or other means that direct communication requests to designated endpoints in cloud computing platform 910. Certain components of cloud computing platform 910 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment; however, the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system to throttle at least one GPU of a node based on a power policy limit and a throttling order, the system comprising:

at least one computer processor; and computer storage media storing computer-useable instructions that, when used by the at least one computer processor, cause the system to perform operations comprising:

obtaining, at the node of the system, a first indication indicative of (1) a plurality of tasks for execution and (2) a corresponding user account associated with each task;

accessing a plurality of computer resource allocation parameters defining a plurality of priority levels, wherein each corresponding user account is associated with a respective priority level, wherein the respective priority levels of the user accounts collectively define the throttling order for a plurality of GPUs to execute the plurality of tasks;

based on the power policy limit associated with the node, determining that a power consumption associated with the execution of the plurality of tasks exceeds the power policy limit associated with the node; and based on the power consumption exceeding the power policy limit and based on the throttling order, throttling the at least one GPU of the plurality of GPUs until the power consumption is at or below the power policy limit associated with the node, wherein throttling the at least one GPU comprises shutting down a virtual machine assigned to a first set of tasks of a plurality of tasks, wherein the first set of tasks is associated with a user account having a priority level that is lower than a priority level of a user account associated with a second set of tasks of the plurality of tasks.

2. The system of claim 1, wherein throttling the at least one GPU comprises reallocating resources from (1) a first virtual machine assigned to a first set of tasks of the plurality of tasks to (2) a second virtual machine assigned to a second set of tasks of the plurality of tasks, wherein the first set of tasks is associated with a user account having a priority level that is lower than a priority level of a user account associated with the second set of tasks.

3. The system of claim 1, wherein throttling the at least one GPU comprises at least one of: lowering a frequency or lowering a voltage of the at least one GPU.

4. The system of claim 1, wherein determining the throttling order comprises:

accessing at least one service-level agreement (SLA) defining the plurality of computer resource allocation parameters;

for each task of the plurality of tasks:

determining the corresponding user account and assigning a corresponding task of the plurality of tasks to one or more GPUs of the plurality of GPUs; and determining, from the SLA, a priority level of each user account, each priority level of the plurality of priority levels associated with a throttling order value; and ranking the plurality of GPUs based on the throttling order value of the corresponding user account associated with a task to be executed by a corresponding GPU, wherein a highest ranked or lowest ranked GPU is first to be throttled based on the power consumption exceeding the power policy limit.

5. The system of claim 1, wherein the power policy limit comprises at least one of:

a first power policy limit defining a maximum power for a rack comprising the node, wherein a rack manager of the rack compares the power of the rack against the first power policy limit;

a second power policy limit defining a maximum power for the node, wherein a motherboard (MB) baseboard management controller (BMC) compares the power of the node against the second power policy limit; or a third power policy limit defining a maximum power for a set of GPUs of the node, wherein a universal baseboard (UBB) BMC compares the power of the set of GPUs against the third power policy limit, wherein the power consumption exceeds the power policy limit when (1) a power output of the rack exceeds the maximum power defined by the first power policy limit, (2) a power output of the node exceeds the maximum power defined by the second power policy limit, or (3) a power output of the set of GPUs exceeds the maximum power defined by the third power policy limit.

6. The system of claim 1, wherein the operations further comprise:

assigning each task of the plurality of tasks to a corresponding GPU of the plurality of GPUs based on availability of the corresponding GPU and a computational resource consumption associated with the task, wherein each GPU of the plurality of GPUs is throttled based on the priority level of a user account associated with the task that is assigned to a respective GPU.

7. The system of claim 1, wherein a first GPU assigned a first task associated with a first user account having a lower priority level is throttled before a second GPU assigned a second task associated with a second user account having a higher priority level.

8. The system of claim 1, wherein throttling the at least one GPU of the plurality of GPUs comprises iteratively throttling a set of GPUs of the plurality of GPUS until the power consumption is at or below the power policy limit.

9. A system to throttle at least one GPU of a node based on a power policy limit and a throttling order, the system comprising:

at least one computer processor; and computer storage media storing computer-useable instructions that, when used by the at least one computer processor, cause the system to perform operations comprising:

obtaining, at the node of the system, a first indication indicative of (1) a plurality of tasks for execution and (2) a corresponding user account associated with each task;

accessing a plurality of computer resource allocation parameters defining a plurality of priority levels, wherein each corresponding user account is associated with a respective priority level, wherein the respective priority levels of the user accounts collectively define the throttling order for a plurality of GPUs to execute the plurality of tasks;

based on the power policy limit associated with the node, determining that a power consumption associated with the execution of the plurality of tasks exceeds the power policy limit associated with the node; and based on the power consumption exceeding the power policy limit and based on the throttling order, throttling the at least one GPU of the plurality of GPUs until the power consumption is at or below the power policy limit associated with the node, wherein throttling the at least one GPU comprises at least one of:

causing a rack manager to distribute power within a rack comprising the node until the power consumption is equal to or less than the power policy limit associated with the node;

causing an MB BMC to distribute power within the node or among the plurality of GPUs until the power consumption is equal to or less than the power policy limit associated with the node; or causing a UBB BMC to distribute power among the plurality of GPUs until the power consumption is equal to or less than the power policy limit associated with the node.

10. The system of claim 9, wherein throttling the at least one GPU comprises reallocating resources from (1) a first virtual machine assigned to a first set of tasks of the plurality of tasks to (2) a second virtual machine assigned to a second set of tasks of the plurality of tasks, wherein the first set of tasks is associated with a user account having a priority level that is lower than a priority level of a user account associated with the second set of tasks.

11. The system of claim 9, wherein throttling the at least one GPU comprises at least one of: lowering a frequency or lowering a voltage of the at least one GPU.

12. A computer-implemented method, comprising:
obtaining, at a node of a rack, a first indication indicative of (1) a plurality of tasks for execution and (2) a corresponding user account associated with each task;
accessing at least one service-level agreement (SLA) defining a plurality of priority levels, wherein each corresponding user account is associated with a respective priority level, wherein the respective priority levels of the user accounts collectively define a throttling order for a plurality of coprocessors to execute the plurality of tasks;
based on a power policy limit associated with the node, determining that a power consumption associated with the execution of the plurality of tasks exceeds the power policy limit associated with the node; and
based on the power consumption exceeding the power policy limit and based on the throttling order, throttling at least one coprocessor of the plurality of coprocessors until the power consumption is at or below the power policy limit associated with the node, wherein throttling the at least one coprocessor comprises shutting down a virtual machine assigned to a first set of tasks of a plurality of tasks, wherein the first set of tasks is associated with a user account having a priority level that is lower than a priority level of a user account associated with a second set of tasks of the plurality of tasks.

13. The computer-implemented method of claim 12, wherein a coprocessor executing a task executed in a production environment is associated with a higher priority level than a coprocessor executing the task in a non-production environment, wherein the task executed in the non-production environment is throttled before the task executed in the production environment.

14. The computer-implemented method of claim 12, wherein the plurality of tasks are associated with an artificial intelligence (AI) workload.

15. The computer-implemented method of claim 12, wherein the first indication is obtained from a workflow orchestrator configured to create, deploy, or monitor a virtual machine on the at least one coprocessor based on the plurality of tasks.

16. The computer-implemented method of claim 12, wherein the at least one coprocessor comprises at least one of: a graphics processing unit (GPU), a field-programmable gate array (FPGA), or an application-specific integrated circuit (ASIC).

17. The computer-implemented method of claim 12, wherein the power policy limit associated with the node is the same across every node of the rack.

18. The computer-implemented method of claim 12, wherein throttling the at least one coprocessor comprises reallocating resources from (1) a first virtual machine assigned to a first set of tasks of the plurality of tasks to (2) a second virtual machine assigned to a second set of tasks of the plurality of tasks, wherein the first set of tasks is associated with a user account having a priority level that is lower than a priority level of a user account associated with the second set of tasks.

19. The computer-implemented method of claim 12, wherein throttling the at least one coprocessor comprises shutting down a virtual machine assigned to a first set of tasks of a plurality of tasks, wherein the first set of tasks is associated with a user account having a priority level that is lower than a priority level of a user account associated with a second set of tasks of the plurality of tasks.

20. The computer-implemented method of claim 12, wherein throttling the at least one coprocessor comprises at least one of:
causing a rack manager to distribute power within a rack comprising the node until the power consumption is equal to or less than the power policy limit associated with the node;
causing an MB BMC to distribute power within the node or among the plurality of coprocessors until the power consumption is equal to or less than the power policy limit associated with the node; or
causing a UBB BMC to distribute power among the plurality of coprocessors until the power consumption is equal to or less than the power policy limit associated with the node.

* * * * *